United States Patent
Kawahara et al.

(10) Patent No.: US 9,711,814 B2
(45) Date of Patent: Jul. 18, 2017

(54) FUEL CELL SYSTEM AND CONTROL METHOD THEREFOR

(75) Inventors: Shuya Kawahara, Gotenba (JP); Manabu Kato, Susono (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 1036 days.

(21) Appl. No.: 13/697,407

(22) PCT Filed: May 25, 2011

(86) PCT No.: PCT/IB2011/001458
§ 371 (c)(1), (2), (4) Date: Nov. 12, 2012

(87) PCT Pub. No.: WO2011/148262
PCT Pub. Date: Dec. 1, 2011

(65) Prior Publication Data
US 2013/0095405 A1    Apr. 18, 2013

(30) Foreign Application Priority Data
May 25, 2010    (JP) .................................. 2010-119447

(51) Int. Cl.
*H01M 8/04537* (2016.01)
*H01M 8/04664* (2016.01)
(Continued)

(52) U.S. Cl.
CPC ..... *H01M 8/04574* (2013.01); *H01M 8/0491* (2013.01); *H01M 8/0494* (2013.01);
(Continued)

(58) Field of Classification Search
None
See application file for complete search history.

(56) References Cited

FOREIGN PATENT DOCUMENTS

| JP | 2004-31232 | 1/2004 |
|---|---|---|
| JP | 2005-93111 | 4/2005 |

(Continued)

OTHER PUBLICATIONS

Mattejat (WO 2010/012577) (a raw machine translation) (Abstract and Detailed Description) (Feb. 4, 2010).*

(Continued)

*Primary Examiner* — Patrick Ryan
*Assistant Examiner* — Carmen Lyles-Irving
(74) *Attorney, Agent, or Firm* — Finnegan, Henderson, Farabow, Garrett & Dunner, LLP

(57) ABSTRACT

A fuel cell system includes an accumulated current value measuring unit. The accumulated current value measuring unit measures an accumulated current value by time integration of current output from the fuel cell in a period during which oxygen is produced by water-splitting reaction in an anode of a negative voltage cell. A control unit uses a first correlation between the accumulated current value in the oxygen generation period and an oxygen consumption rate in the anode and a second correlation between a current density of the fuel cell in the oxygen generation period and an oxygen production rate in the anode to obtain a current density at or below which the amount of oxygen in the anode may be reduced, and causes the fuel cell to output electric power at a current density lower than the obtained current density.

9 Claims, 20 Drawing Sheets

(51) Int. Cl.
H01M 8/04858 (2016.01)
H01M 8/04828 (2016.01)
(52) U.S. Cl.
CPC ... H01M 8/04552 (2013.01); H01M 8/04671 (2013.01); *Y10T 307/779* (2015.04)

(56) References Cited

FOREIGN PATENT DOCUMENTS

| | | |
|---|---|---|
| JP | 2007-265929 | 10/2007 |
| WO | WO 2010/012577 | 2/2010 |
| WO | WO 2010/012577 A1 | 2/2010 |

OTHER PUBLICATIONS

Mattejat (WO 2010/012577) (a raw machine translation) (Abstract and Claims) (Feb. 4, 2010).*
Written Opinion of the International Searching Authority in International Application No. PCT/IB2011/001458; Mailing Date: Nov. 17, 2011.

* cited by examiner $$2H_2O \rightarrow O_2 + 4H^+ + 4e^-$$

$$2H_2O \rightarrow O_2 + 4H^+ + 4e^-$$
$$H_2 + 1/2 O_2 \rightarrow H_2O$$

OXYGEN PRODUCTION RATE IS HIGH

WATER-SPLITTING REACTION CONTINUES

OXYGEN PRODUCTION RATE IS LOW

NORMAL POWER GENERATION REACTION MAY BE RESUMED

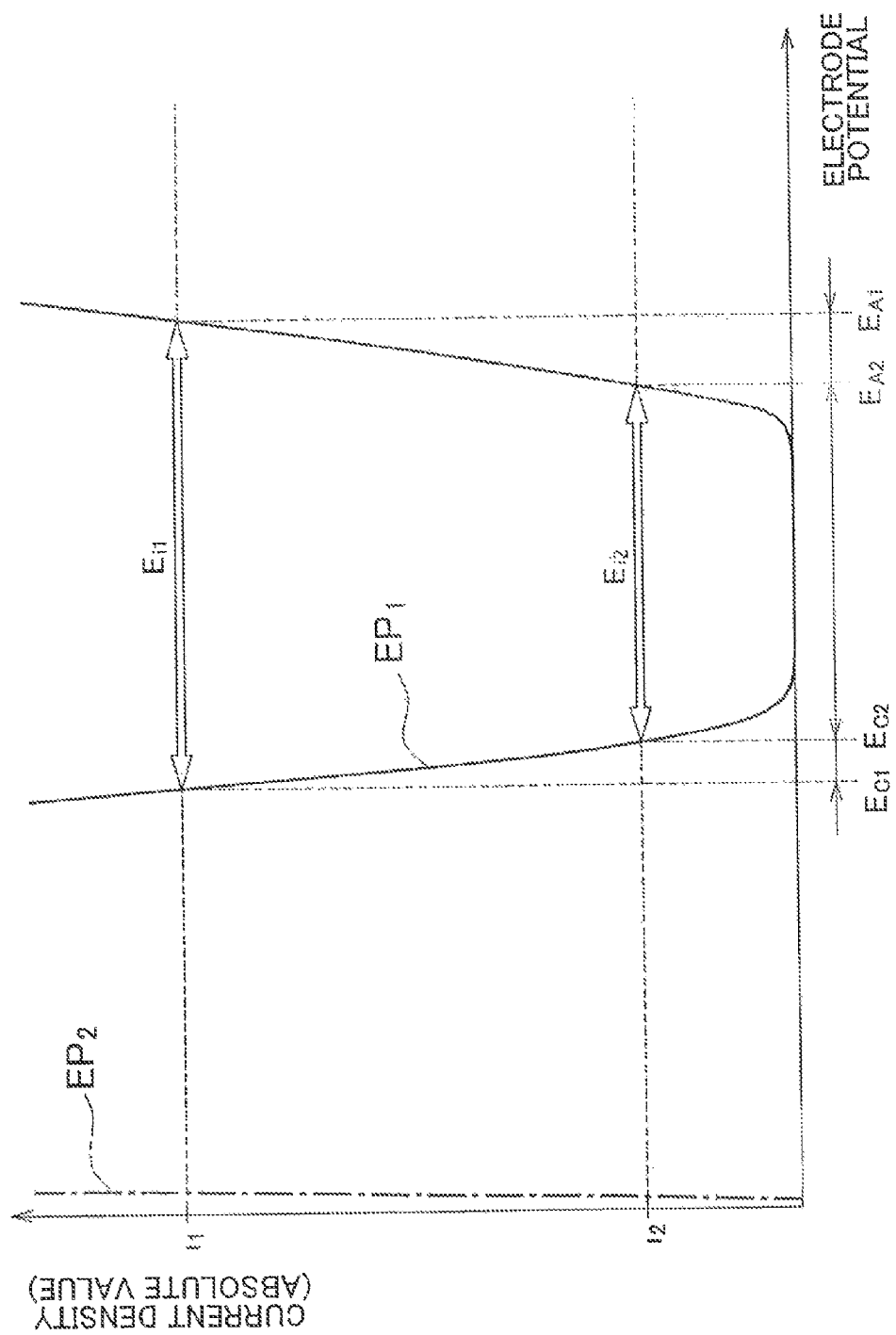

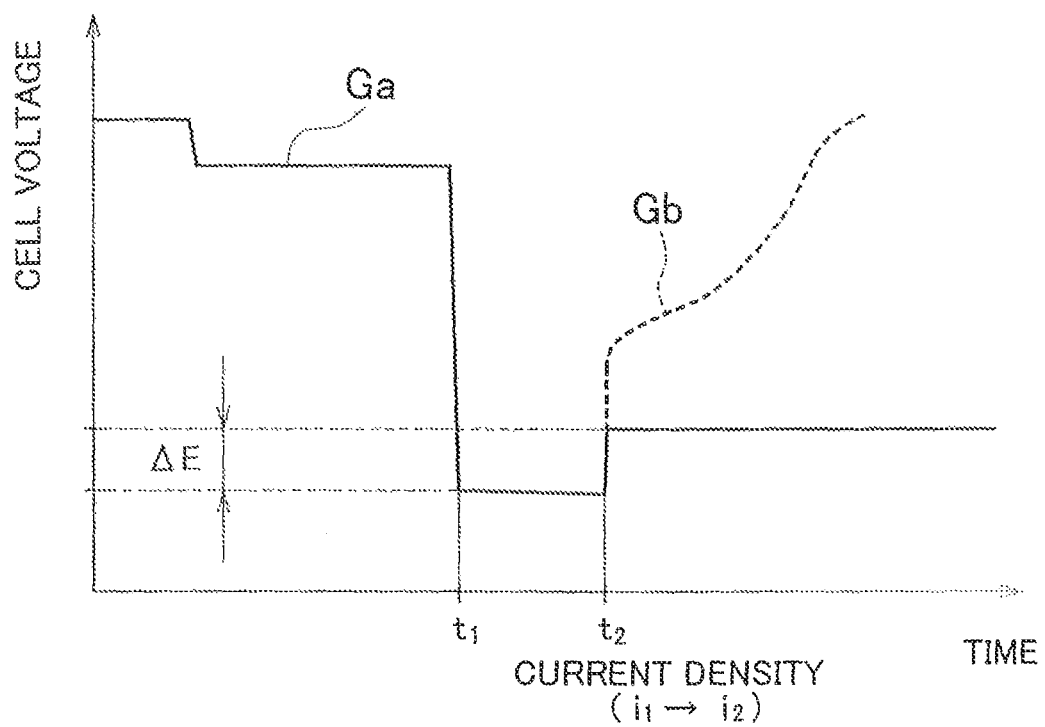

REFERENCE EXAMPLE

REFERENCE EXAMPLE

FUEL CELL SYSTEM AND CONTROL METHOD THEREFOR

CROSS-REFERENCE TO RELATED APPLICATIONS

This application is a national phase application of International Application No. PCT/IB2011/001458, filed May 25, 2011, and claims the priority of Japanese Application No. 2010-119447, filed May 25, 2010, the content of both of which is incorporated herein by reference.

BACKGROUND OF THE INVENTION

1. Field of the Invention

The invention relates to a fuel cell.

2. Description of Related Art

A fuel cell usually has a stack structure in which a plurality of single cells that serve as power generating elements are stacked. Reaction gases flow into gas flow passages, provided for each single cell, via respective manifolds and are supplied to a power generating portion of each single cell. However, if the gas flow passages of part of the single cells are blocked by frozen water content, or the like, the amounts of reaction gases supplied to the part of the single cells become insufficient, so the part of the single cells may possibly generate negative voltage. In this way, when the operation of the fuel cell is continued in a state where part of the single cells generate negative voltage, not only the power generation performance of the fuel cell overall deteriorates but also the electrodes of those single cells may possibly degrade. To take measures against the above problems, for example, like the techniques described in Japanese Patent Application Publication No. 2005-093111 (JP-A-2005-093111), Japanese Patent Application Publication No. 2004-031232 (JP-A-2004-031232) and Japanese Patent Application Publication No. 2007-265929 (JP-A-2007-265929), various techniques for suppressing deterioration of the power generation performance of a fuel cell or degradation of a fuel cell due to such negative voltage have been suggested so far.

SUMMARY OF THE INVENTION

The invention provides a technique for suppressing performance deterioration and degradation of a fuel cell due to negative voltage.

A first aspect of the invention relates to a fuel cell system that outputs electric power in response to a request from an external load. The fuel cell system includes: a fuel cell that has at least one power generating element; a control unit that controls electric power output from the fuel cell; and an accumulated current value measuring unit that measures an accumulated current value that is obtained by time integration of current output from the fuel cell, wherein the accumulated current value measuring unit measures an accumulated current value in an oxygen generation period during which there is a possibility that negative voltage is generated in the at least one power generating element and oxygen is produced by water-splitting reaction in an anode of the at least one power generating element, the control unit prestores a first correlation between a predetermined value based on the accumulated current value in the oxygen generation period and an oxygen consumption rate at which oxygen is recombined with hydrogen to be consumed in the anode of the at least one power generating element in which negative voltage is generated and a second correlation between a current density of the fuel cell in the oxygen generation period and an oxygen production rate at which oxygen is produced in the anode of the at least one power generating element in which negative voltage is generated in the oxygen generation period, and, when it is determined that there is a possibility that negative voltage is generated in the at least one power generating element, the control unit uses the first correlation to obtain an oxygen consumption rate and uses the second correlation to obtain a current density corresponding to an oxygen production rate equivalent to the oxygen consumption rate obtained from the first correlation, and executes output restricting process of causing the fuel cell to output electric power at a current density that is lower than the obtained current density corresponding to the oxygen production rate.

According to the above aspect, using the first and second correlations, it is possible to reduce the current density so as to reduce oxygen, which inhibits a recovery from negative voltage, in the anode of the at least one power generating element in which negative voltage is generated. Thus, it is possible to suppress performance deterioration and degradation of the fuel cell due to negative voltage.

In addition, the fuel cell system according to the above aspect may further include a negative voltage detecting unit that measures a voltage of the at least one power generating element to detect negative voltage in the at least one power generating element, wherein the accumulated current value measuring unit measures an accumulated current value in an oxygen generation period during which negative voltage is generated in the at least one power generating element and oxygen is produced by water-splitting reaction in the anode of the at least one power generating element, the first correlation may be a correlation between the accumulated current value in the oxygen generation period and the oxygen consumption rate at which oxygen is recombined with hydrogen to be consumed in the anode of the at least one power generating element in which negative voltage is generated, and, when negative voltage has been detected in the at least one power generating element, the control unit may use the first correlation to obtain an oxygen consumption rate corresponding to the accumulated current value in the oxygen generation period and may use the second correlation to obtain a current density corresponding to an oxygen production rate equivalent to the oxygen consumption rate obtained from the first correlation, and may execute output restricting process of causing the fuel cell to output electric power at a current density that is lower than the obtained current density corresponding to the oxygen production rate.

In addition, the fuel cell system according to the above aspect may further include a reaction gas supply unit that supplies reaction gas to the fuel cell, wherein, when negative voltage has been detected in the at least one power generating element, the control unit may decrease the current density of the fuel cell within a preset range and may detect a variation in voltage of the at least one power generating element, in which negative voltage is generated, before and after the current density is decreased, and, when the variation in voltage falls within a predetermined allowable range, the control unit may execute the output restricting process and executes a gas amount increasing process of increasing an amount of reaction gas supplied to the fuel cell; whereas, when the variation in voltage falls outside the predetermined allowable range, the control unit may execute the gas amount increasing process without executing the output restricting process.

According to the above aspect, when a variation in voltage of the at least one power generating element in which negative voltage is generated when the current density is decreased falls within a range equivalent to a variation In voltage in a predetermined state that it is desirable to execute the output restricting process, the output restricting process is executed. Thus, it is possible to appropriately select and execute process for recovering from negative voltage.

In addition, the fuel cell system according to the above aspect may further include a control switch that is used to control electrical connection between the fuel cell and the external load, wherein, when the current density corresponding to the oxygen production rate is lower than a preset value in the output restricting process, the control unit may interrupt electrical connection between the external load and the fuel cell and then may execute reconnection process of electrically connecting the fuel cell to the external load again, and, in the reconnection process, the control unit may set an interval time from when electrical connection between the fuel cell and the external load is interrupted to when the fuel cell is connected to the external load again on the basis of the accumulated current value in the oxygen generation period.

According to the above aspect, even when it is difficult to recover from negative voltage through the output restricting process, it is possible to recover from negative voltage by interrupting electrical connection between the fuel cell and the external load. Then, by reconnecting the fuel cell to the external load after a lapse of an appropriately determined interval time, it is possible to suppress negative voltage from occurring again after reconnection.

In addition, the fuel cell system according to the above aspect may further include a negative voltage detecting unit that measures a voltage of the at least one power generating element to detect negative voltage in the at least one power generating element; and an operating state detecting unit that includes at least one of a humidity coefficient detecting unit that detects a wet state inside the fuel cell and an operating temperature measuring unit that detects an operating temperature of the fuel cell, wherein the accumulated current value measuring unit may measure an accumulated current value in an oxygen generation period during which (negative voltage is generated in the at least one power generating element and oxygen is produced by water-splitting reaction in the anode of the at least one power generating element, the first correlation may be a correlation prepared for each accumulated current value in the oxygen generation period, and may be a correlation between at least one of the wet state detected by the humidity coefficient detecting unit and the operating temperature detected by the operating temperature measuring unit and an oxygen consumption rate at which oxygen is recombined with hydrogen to be consumed in the anode of the at least one power generating element in which negative voltage is generated, and, when negative voltage has been detected in the at least one power generating element, the control unit may use the first correlation corresponding to the accumulated current value in the oxygen generation period to obtain an oxygen consumption rate corresponding to the at least one of the wet state detected by the humidity coefficient detecting unit and the operating temperature detected by the operating temperature measuring unit and may use the second correlation to obtain a current density corresponding to an oxygen production rate equivalent to the oxygen consumption rate obtained from the first correlation, and may execute output restricting process of causing the fuel cell to output electric power at a current density that is lower than the obtained current density corresponding to the oxygen production rate.

According to the above aspect, it is possible to obtain an oxygen consumption rate on the basis of the humidity inside the fuel cell or the operating temperature of the fuel cell, so it is possible to further appropriately decrease the current density in order to recover from negative voltage.

In addition, in the fuel cell system according to the above aspect, the accumulated current value measuring unit may measure an accumulated current value in an oxygen generation period during which the fuel cell is operated in a state where a preset environmental condition that negative voltage is generated in the at least one power generating element and oxygen is produced by water-splitting reaction in the anode of the at least one power generating element is satisfied, the first correlation may be a correlation between the accumulated current value in the oxygen generation period and an oxygen consumption rate at which oxygen is recombined with hydrogen to be consumed in the anode of the at least one power generating element in which negative voltage is generated, and, when the fuel cell is operated in the oxygen generation period, the control unit may use the first correlation to obtain an oxygen consumption rate corresponding to the accumulated current value in the oxygen generation period and may use the second correlation to obtain a current density corresponding to an oxygen production rate equivalent to the oxygen consumption rate obtained from the first correlation, and may execute output restricting process of causing the fuel cell to output electric power at a current density that is lower than the obtained current density corresponding to the oxygen production rate.

According to the above aspect, when an environmental condition that is empirically and experimentally assumed to be the case where negative voltage is highly likely to occur is satisfied, output restricting process is executed even when negative voltage does not occur. Thus, it is possible to further reliably suppress performance deterioration and degradation of the fuel cell.

A second aspect of the invention relates to a fuel cell system that outputs electric power in response to a request from an external load. The fuel cell system includes: a fuel cell that has at least one power generating element; a reaction gas supply unit that supplies reaction gas to the fuel cell; a negative voltage detecting unit that detects negative voltage in tire at least one power generating element; a control unit that controls electric power output from the fuel cell; and an accumulated current value measuring unit that measures an accumulated current value that is obtained by time integration of current output from the fuel cell, wherein, when negative voltage is generated in the at least one power generating element, the control unit executes recovery process of increasing an amount of supplied reaction gas in order to recover from the negative voltage, the control unit prestores a correlation between an accumulated current value in a negative voltage generation period during which the negative voltage is generated in the at least one power generating element and a current density at or below which the at least one power generating element can recover from the negative voltage through the recovery process, and, when negative voltage has been detected in the at least one power generating element, the control unit uses the correlation to execute output restricting process of causing the fuel cell to output electric power at a current density that is lower than or equal to a current density obtained in correspondence with the accumulated current value in the negative voltage generation period.

According to the above aspect, by using the accumulated current value and the prepared correlation, a current density at or below which it is possible to recover from negative voltage through the recovery process is obtained, and the fuel cell is caused to generate electric power at that current density to thereby make it possible to recover from negative voltage.

A third aspect of the invention relates to a fuel cell system that outputs electric power in response to a request from an external load. The fuel cell system includes: a fuel cell that has at least one power generating element; a negative voltage detecting unit that detects negative voltage in the at least one power generating element; a control unit that controls electric power output from the fuel cell; and an accumulated current value measuring unit that measures an accumulated current value that is obtained by time integration of current output from the fuel cell, wherein, when negative voltage has been detected in the at least one power generating element, the control unit interrupts electrical connection between the external load and the fuel cell and then executes reconnection process of electrically connecting the fuel cell to the external load again, and, in the reconnection process, the control unit sets an interval time from when electrical connection between the fuel cell and the external load is interrupted to when the fuel cell is connected to the external load again on the basis of the accumulated current value in the oxygen generation period.

According to the above aspect, the at least one power generating element in which negative voltage is generated is recovered from negative voltage by interrupting electrical connection between the fuel cell and the external load. Then, by reconnecting the fuel cell to the external load after a lapse of an appropriately determined interval time, it is possible to suppress negative voltage from occurring again after reconnection.

A fourth aspect of the invention relates to a fuel cell system that outputs electric power in response to a request from an external load. The fuel cell system includes: a fuel cell that has at least one power generating element; a negative voltage detecting unit that measures a voltage of the at least one power generating element to detect negative voltage; a control unit that controls electric power output from the fuel cell; an accumulated current value measuring unit that measures an accumulated current value that is obtained by time integration of current output from the fuel cell; and a reaction gas supply unit that supplies reaction gas to the fuel cell, wherein, when negative voltage has been detected in the at least one power generating element, the control unit decreases a current density of the fuel cell within a preset range and detects a variation in voltage of the at least one power generating element, in which negative voltage is generated, before and after the current density is decreased, and, when the variation in voltage falls within a predetermined allowable range, the control unit further decreases the current density of the fuel cell and increases an amount of reaction gas supplied to the fuel cell; whereas, when the variation in voltage falls outside the predetermined allowable range, the control unit increases the amount of reaction gas supplied to the fuel cell without decreasing the current density of the fuel cell.

According to the above aspect, it is possible to appropriately select and execute process for recovering from negative voltage on the basis of a variation in voltage corresponding to a decrease in current density in the at least one power generating element in which negative voltage is generated.

A fifth aspect of the invention relates to a control method for a fuel cell system that includes a fuel cell having at least one power generating element. The control method includes: determining whether there is a possibility that negative voltage is generated in the at least one power generating element; measuring an accumulated current value in an oxygen generation period during which there is a possibility that negative voltage is generated in the at least one power generating element and oxygen is produced by water-splitting reaction in an anode of the at least one power generating element; consulting a preset first correlation between a predetermined value based on the accumulated current value in the oxygen generation period and an oxygen consumption rate at which oxygen is recombined with hydrogen to be consumed in the anode of the at least one power generating element in which negative voltage is generated and a preset second correlation between a current density of the fuel cell in the oxygen generation period and an oxygen production rate at which oxygen is produced in the anode of the at least one power generating element in which negative voltage is generated in the oxygen generation period; and obtaining an oxygen consumption rate using the first correlation and obtaining a current density corresponding to an oxygen production rate equivalent to the oxygen consumption rate obtained from the first correlation using the second correlation, and executing output restricting process of causing the fuel cell to output electric power at a current density that is lower than the obtained current density corresponding to the oxygen production rate.

In addition, in the control method according to the above aspect, negative voltage in the at least one power generating element may be detected using a detecting unit, the first correlation may be a preset correlation between the accumulated current value in the oxygen generation period and an oxygen consumption rate at which oxygen is recombined with hydrogen to be consumed in the anode of the at least one power generating element in which negative voltage is generated, and an oxygen consumption rate corresponding to the accumulated current value in the oxygen generation period may be obtained using the first correlation, a current density corresponding to an oxygen production rate equivalent to the oxygen consumption rate obtained from the first correlation may be obtained using the second correlation, and output restricting process of causing the fuel cell to output electric power at a current density that is lower than the obtained current density corresponding to the oxygen production rate may be executed.

In addition, in the control method according to the above aspect, an accumulated current value in an oxygen generation period during which the fuel cell is operated in a state where a preset environmental condition that negative voltage is generated in the at least one power generating element and oxygen is produced by water-splitting reaction in the anode of the at least one power generating element is satisfied may be measured, the first correlation may be a preset correlation between the accumulated current value in the oxygen generation period and an oxygen consumption rate at which oxygen is recombined with hydrogen to be consumed in the anode of the at least one power generating element in which negative voltage is generated, and an oxygen consumption rate corresponding to the accumulated current value in the oxygen generation period may be obtained using the first correlation and a current density corresponding to an oxygen production rate equivalent to the oxygen consumption rate obtained from the first correlation may be obtained using the second correlation, and output restricting process of causing the fuel cell to output electric power at a current density that is lower than the obtained current density corresponding to the oxygen production rate may be executed.

Note that the aspects of the invention may be implemented in various forms, and, for example, may be implemented in a form, such as a fuel cell system, a vehicle equipped with the fuel cell system, a control method for the fuel cell system, a computer program for implementing the functions of those system, vehicle and control method, and a recording medium that records the computer program.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 17 is a graph that illustrates the correlation between an electrode potential and a current density in a single cell according to the fourth embodiment of the invention;

FIG. 18 is a graph for illustrating a variation in cell voltage in a negative voltage cell in which negative voltage is generated because of poor hydrogen supply according to the fourth embodiment of the invention.

DETAILED DESCRIPTION OF EMBODIMENTS

Figure 1:
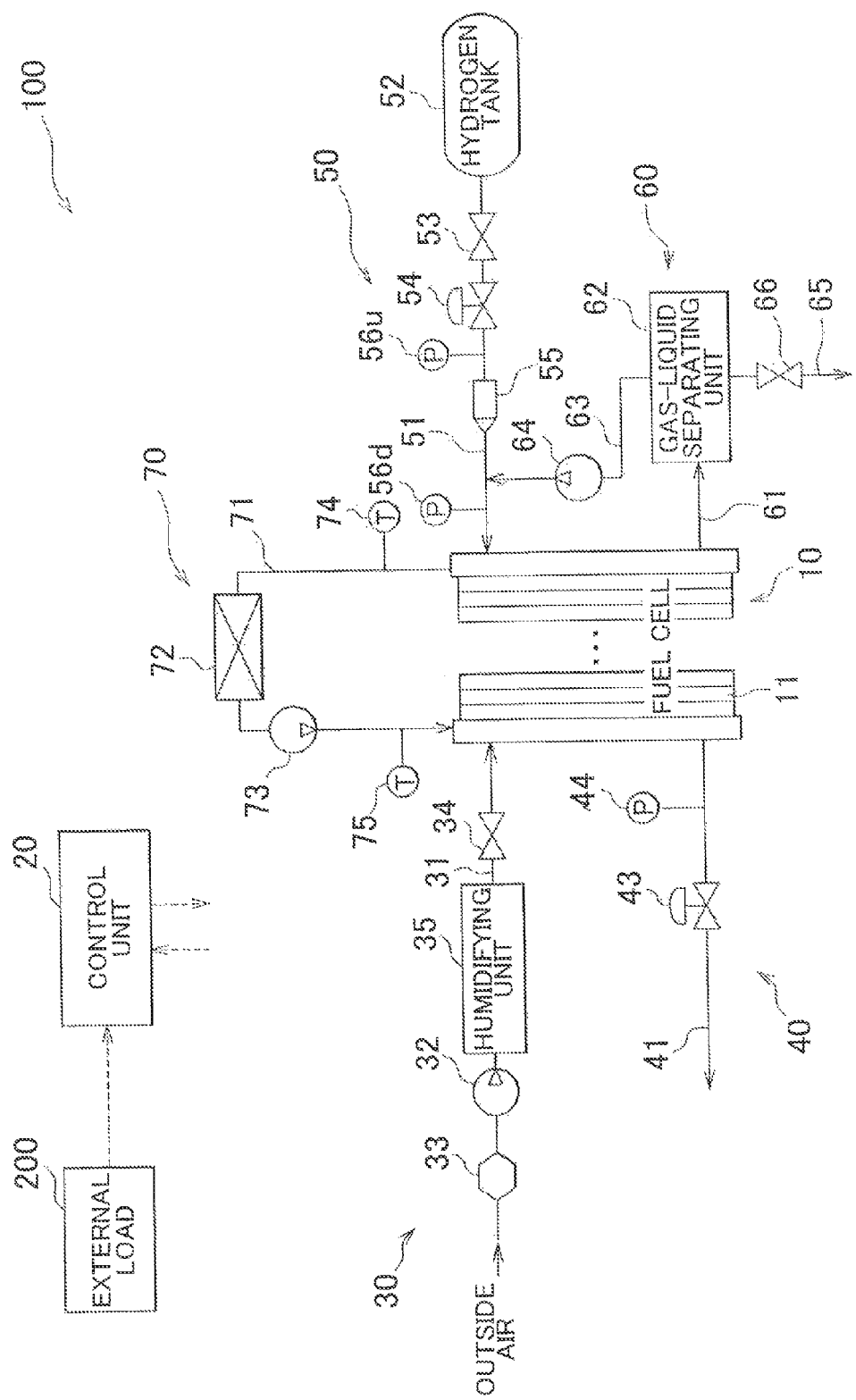
FIG. 1 is a schematic view that shows the configuration of a fuel cell system according to a first embodiment of the invention.

FIG. 1 is a schematic view that shows the configuration of a fuel cell system according to a first embodiment of the invention. The fuel cell system 100 includes a fuel cell 10, a control unit 20, a cathode gas supply unit 30, a cathode gas exhaust unit 40, an anode gas supply unit 50, an anode gas circulation exhaust unit 60 and a refrigerant supply unit 70.

The fuel cell 10 is a polymer electrolyte fuel cell that is supplied with hydrogen (anode gas) and air (cathode gas) as reaction gases to generate electric power. The fuel cell 10 has a stack structure in which a plurality of power generating elements 11 called single cells are stacked. Each power generating element 11 includes a membrane electrode assembly (not shown) and two separators (not shown). The membrane electrode assembly is the power generating element in which electrodes are arranged on both surfaces of an electrolyte membrane. The two separators sandwich the membrane electrode assembly.

Here, the electrolyte membrane may be formed of a solid polymer thin film that exhibits favorable proton conductivity in a wet state. In addition, each electrode may be formed of carbon (C) that supports a catalyst (for example, platinum (Pt)) for facilitating power generation reaction and an ionomer that has a gas permeability. Manifolds (not shown) for reaction gases and refrigerant are provided for each power generating element 11. Reaction gases in the manifolds are supplied to the power generating portion of each power generating element 11 via the respective gas flow passages provided for each power generating element 11.

The control unit 20 is formed of a microcomputer that includes a central processing unit and a main storage. The control unit 20 accepts an output power request from an external load 200. In response to the request, the control unit 20 controls structural units of the fuel cell system 100 described below to cause the fuel cell 10 to generate electric power.

The cathode gas supply unit 30 includes a cathode gas line 31, an air compressor 32, an air flow meter 33, an on-off valve 34 and a humidifying unit 35. The cathode gas line 31 is connected to the cathode of the fuel cell 10. The air compressor 32 is connected to the fuel cell 10 via the cathode gas line 31. The air compressor 32 takes in and compresses outside air, and supplies the compressed air to the fuel cell 10 as cathode gas.

The air flow meter 33 measures the flow rate of outside air taken in by the air compressor 32 at a portion upstream of the air compressor 32, and then transmits the measured flow rate to the control unit 20. The control unit 20 drives the air compressor 32 on the basis of the measured flow rate to control the amount of air supplied to the fuel cell 10.

The on-off valve 34 is provided between the air compressor 32 and the fuel cell 10. The on-off valve 34 opens or closes in response to flow of supplied air in the cathode gas line 31. Specifically, the on-off valve 34 is normally closed, and opens when air having a predetermined pressure is supplied from the air compressor 32 to the cathode gas line 31.

The humidifying unit 35 humidifies high-pressure air pumped from the air compressor 32. In order to keep a wet state of the electrolyte membranes to obtain favorable proton conductivity, the control unit 20 vises the humidifying unit 35 to control the humidification amount of air supplied to the fuel cell 10 to thereby regulate the wet state inside the fuel cell 10. Note that the humidifying unit 35 may be omitted.

The cathode gas exhaust unit 40 includes a cathode exhaust gas line 41, a pressure regulating valve 43 and a pressure measuring unit 44. The cathode exhaust gas line 41 is connected to the cathode of the fuel cell 10, and exhausts cathode exhaust gas to the outside of the fuel cell system 100. The pressure regulating valve 43 regulates the pressure of cathode exhaust gas (back pressure of the fuel cell 10) in the cathode exhaust gas line 41. The pressure measuring unit 44 is provided at a portion upstream of the pressure regulating valve 43. The pressure measuring unit 44 measures the pressure of cathode exhaust gas, and then transmits the measured pressure to the control unit 20. The control unit 20 regulates the opening degree of the pressure regulating valve 43 on the basis of the pressure measured by the pressure measuring unit 44.

The anode gas supply unit 50 includes an anode gas line 51, a hydrogen tank 52, an on-off valve 53, a regulator 54, an injector 55 and two pressure measuring units 56$u$ and 56$d$. The hydrogen tank 52 is connected to the anode of the fuel cell 10 via the anode gas line 51, and supplies hydrogen filled in the tank to the fuel cell 10. Note that the fuel cell system 100 may include a reforming unit instead of the hydrogen tank 52 as a hydrogen supply source. The reforming unit reforms hydrocarbon-based fuel to produce hydrogen.

The on-off valve 53, the regulator 54, the first pressure measuring unit 56$u$, the injector 55 and the second pressure measuring unit 56$d$ are provided in the anode gas line 51 from the upstream side (side adjacent to the hydrogen tank 52) in the stated order. The on-off valve 53 opens or closes in response to a command from the control unit 20. The on-off valve 53 controls flow of hydrogen from the hydrogen tank 52 toward the upstream side of the injector 55. The regulator 54 is a pressure reducing valve for regulating the pressure of hydrogen at a portion upstream of the injector 55. The opening degree of the regulator 54 is controlled by the control unit 20.

The injector 55 is an electromagnetically driven on-off valve of which the valve element is electromagnetically driven in accordance with a driving interval or valve open duration set by the control unit 20. The control unit 20 controls the driving interval or valve open duration of the injector 55 to control the amount of hydrogen supplied to the fuel cell 10. The first and second pressure measuring units 56$u$ and 56$d$ respectively measure the pressure of hydrogen at a portion upstream of the injector 55 and the pressure of hydrogen at a portion downstream of the injector 55, and then transmit the measured pressures to the control unit 20. The control unit 20 uses these measured pressures to determine the driving interval or valve open duration of the injector 55.

The anode gas circulation exhaust unit 60 includes an anode exhaust gas line 61, a gas-liquid separating unit 62, an anode gas circulation line 63, a hydrogen circulation pump 64, an anode drain line 65 and a drain valve 66. The anode exhaust gas line 61 connects the outlet of the anode of the fuel cell 10 to the gas-liquid separating unit 62. The anode exhaust gas line 61 leads anode exhaust gas that includes unreacted gas (hydrogen, nitrogen, and the like) that is not used in power generation reaction to the gas-liquid separating unit 62.

The gas-liquid separating unit 62 is connected to the anode gas circulation line 63 and the anode drain line 65. The gas-liquid separating unit 62 separates gas components and water content included in anode exhaust gas. The gas-liquid separating unit 62 leads the gas components to the anode gas circulation line 63, and leads the water content to the anode drain line 65.

The anode gas circulation line 63 is connected to the anode gas line 51 at a portion downstream of the injector 55. The hydrogen circulation pump 64 is provided in the anode gas circulation line 63. Hydrogen included in the gas components separated by the gas-liquid separating unit 62 is pumped to the anode gas line 51 by the hydrogen circulation pump 64. In this way, in the fuel cell system 100, hydrogen included in anode exhaust gas is circulated and supplied again to the fuel cell 10 to thereby improve the usage efficiency of hydrogen.

The anode drain line 65 is used to drain the water content separated by the gas-liquid separating unit 62 to the outside of the fuel cell system 100. The drain valve 66 is provided in the anode drain line 65. The drain valve 66 opens or closes in response to a command from the control unit 20. The control unit 20 normally closes the drain valve 66 during operation of the fuel cell system 100, and opens the drain valve 66 at a predetermined drain timing set in advance or a timing at which inert gas included in anode exhaust gas is exhausted.

The refrigerant supply unit 70 includes a refrigerant line 71, a radiator 72, a refrigerant circulation pump 73 and two refrigerant temperature measuring units 74 and 75. The refrigerant line 71 connects a refrigerant inlet manifold to a refrigerant outlet manifold. The refrigerant inlet manifold and the refrigerant outlet manifold are provided for the fuel cell 10. The refrigerant line 71 circulates refrigerant for cooling the fuel cell 10. The radiator 72 is provided in the refrigerant line 71. The radiator 72 exchanges heat between refrigerant flowing in the refrigerant line 71 and outside air to thereby cool the refrigerant.

The refrigerant circulation pump 73 is provided in the refrigerant line 71 at a portion downstream of the radiator 72 (adjacent to the refrigerant inlet of the fuel cell 10). The refrigerant circulation pump 73 pumps refrigerant cooled by the radiator 72 to the fuel cell 10. The two refrigerant temperature measuring units 74 and 75 are respectively provided near the refrigerant outlet of the fuel cell 10 and near the refrigerant inlet of the fuel cell 10 in the refrigerant line 71. The two refrigerant temperature measuring units 74 and 75 respectively transmit the measured temperatures to the control unit 20. The control unit 20 detects the operating temperature of the fuel cell 10 from a difference between the respective temperatures measured by the two refrigerant temperature measuring units 74 and 75, and then controls the amount of refrigerant pumped by the refrigerant circulation pump 73 on the basis of the detected operating temperature to thereby regulate the operating temperature of the fuel cell 10.

Figure 2:
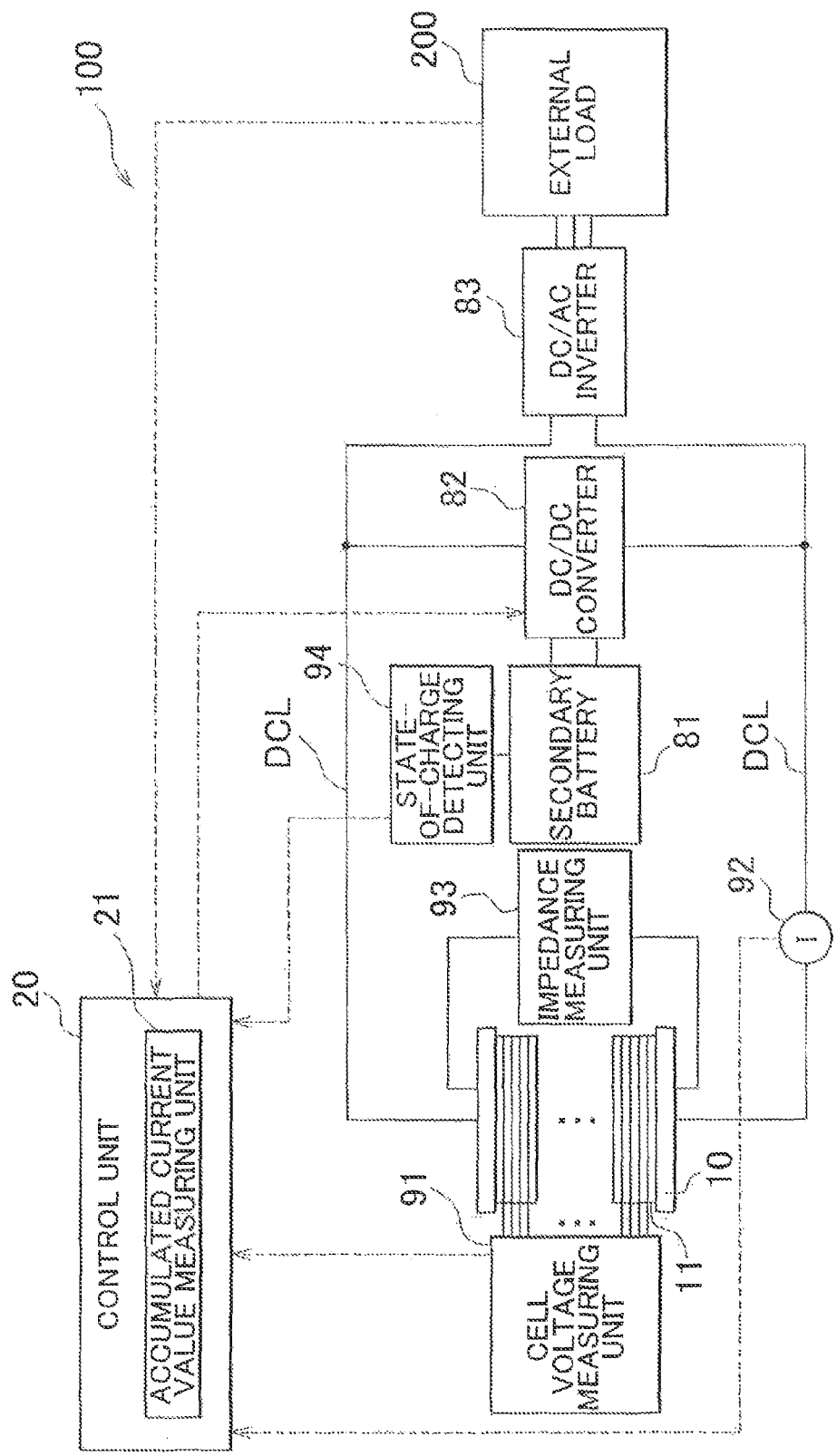
FIG. 2 is a schematic view that shows the electrical configuration of the fuel cell system according to the first embodiment of the invention.

FIG. 2 is a schematic view that shows the electrical configuration of the fuel cell system 100. The fuel cell system 100 includes a secondary battery 81, a DC/DC converter 82 and a DC/AC inverter 83. in addition, the fuel cell system 100 includes a cell voltage measuring unit 91, a current measuring unit 92, an impedance measuring unit 93 and a state-of-charge detecting unit 94.

The fuel cell 10 is connected to the DC/AC inverter 83 via a direct current power supply line DCL. The secondary battery 81 is connected to the direct current power supply line DCL via the DC/DC converter 82. The DC/AC inverter 83 is connected to the external load 200. Note that, in the fuel cell system 100, part of electric power output from the fuel cell 10 and the secondary battery 81 is used to drive auxiliaries that constitute the fuel cell system 100; however, wiring for the auxiliaries is not shown and the description thereof is omitted.

The secondary battery 81 functions as an auxiliary power supply of the fuel cell 10. The secondary battery 81 may be, for example, formed of a chargeable and dischargeable lithium ion battery. The DC/DC converter 82 functions as a charge/discharge control unit that controls charging/discharging of the secondary battery 81. The DC/DC converter 82 variably regulates the voltage level of the direct current power supply line DCL in response to a command from the control unit 20. If electric power output from the fuel cell 10 is insufficient for an output request from the external load 200, the control unit 20 instructs the DC/DC converter 82 to discharge the secondary battery 81 in order to compensate for the insufficient electric power.

The DC/AC inverter 83 converts direct current electric power obtained from the fuel cell 10 and the secondary battery 81 to alternating current electric power, and then supplies the alternating current electric power to the external load 200. Note that, when regenerative electric power is generated in the external load 200, the regenerative electric power is converted to direct current electric power by the DC/AC inverter 83, and then the secondary battery 81 is charged with the direct current electric power by the DC/DC converter 82.

The cell voltage measuring unit 91 is connected to each power generating element 11 of the fuel cell 10 to measure the voltage (cell voltage) of each power generating element 11. The cell voltage measuring unit 91 transmits the measured cell voltages to the control unit 20. Note that the cell voltage measuring unit 91 may transmit only the lowest cell voltage among the measured cell voltages to the control unit 20.

The current measuring unit 92 is connected to the direct current power supply line DCL. The current measuring unit 92 measures the current output from the fuel cell 10, and then transmits the measured current to the control unit 20. The state-of-charge detecting unit 94 is connected to the secondary battery 81. The state-of-charge detecting unit 94 detects the state of charge (SOC) of the secondary battery 81, and then transmits the detected SOC to the control unit 20.

The impedance measuring unit 93 is connected to the fuel cell 10. The impedance measuring unit 93 applies alternating current to the fuel cell 10 to thereby measure the impedance of the fuel cell 10. Here, it is known that the impedance of the fuel cell 10 varies with the amount of water content present inside the fuel cell 10. That is, when the correlation between the impedance of the fuel cell 10 and the amount of water content (humidity) inside the fuel cell 10 is acquired in advance, it is possible to obtain the amount of water content (humidity) inside the fuel cell 10 on the basis of the measured impedance of the fuel cell 10.

Incidentally, in the fuel cell system 100 according to the first embodiment, the control unit 20 also functions as an accumulated current value measuring unit 21. The accumulated current value measuring unit 21 integrates current output from the fuel cell 10, measured by the current measuring unit 92, with respect to time for a predetermined period of time to thereby calculate an accumulated current value that indicates the electric charge output from the fuel cell 10. The control unit 20 uses the accumulated current value to execute process for recovering from negative voltage (described later) generated in part of the power generating elements 11 of the fuel cell 10, and the detailed description thereof will be described later.

Figure 3A:
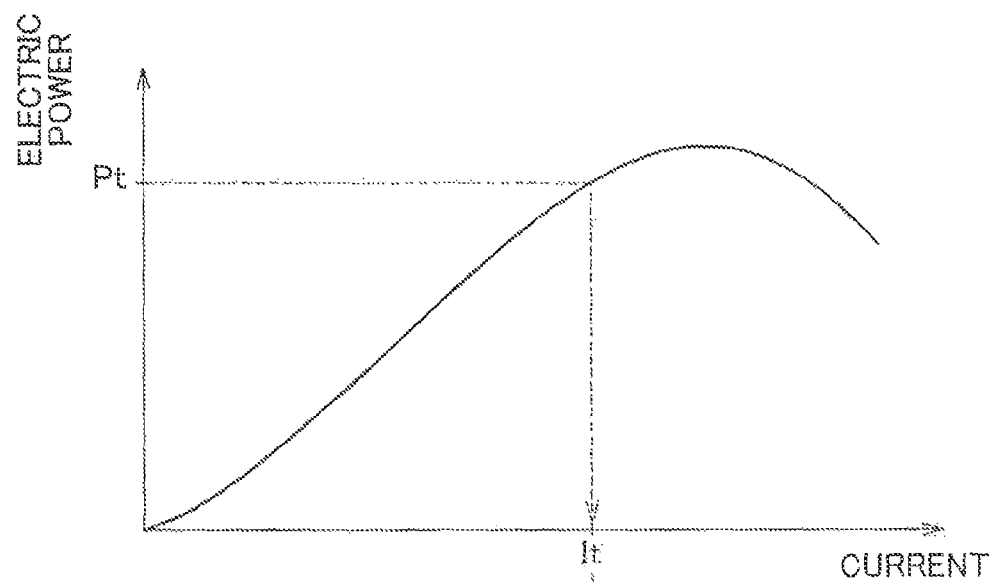
FIG. 3A and FIG. 3B are graphs for illustrating output control over a fuel cell of the fuel cell system according to the first embodiment of the invention.
Figure 3B:
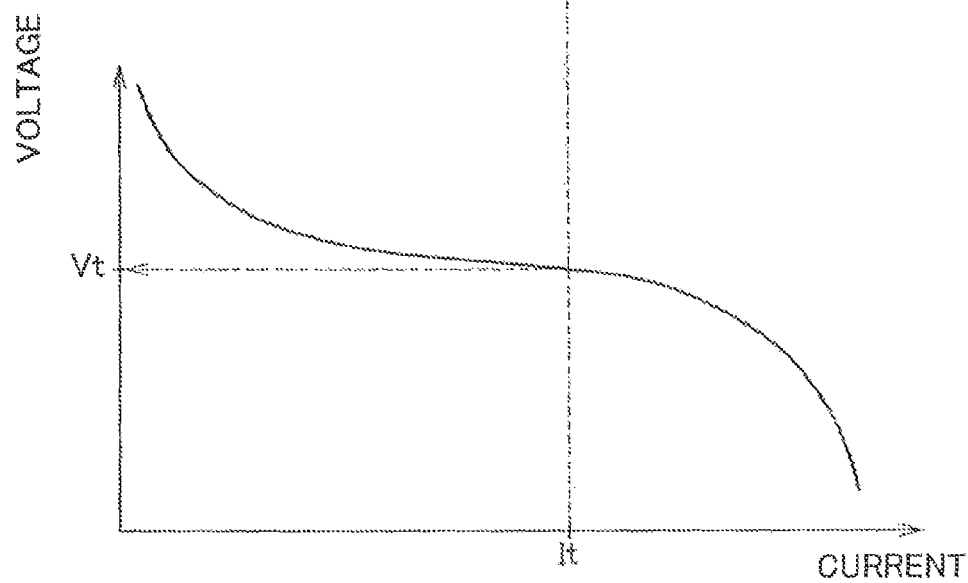

FIG. 3A and FIG. 3B are graphs for illustrating output control over the fuel cell 10 of the fuel cell system 100 according to the first embodiment. FIG. 3A is a graph that shows the W-I characteristics of the fuel cell 10, in which the ordinate axis represents the electric power of the fuel cell 10 and the abscissa axis represents the current of the fuel cell 10. Generally, the W-I characteristics of a fuel cell are shown by an upward-convex curve.

FIG. 3B is a graph that shows the V-I characteristics of the fuel cell 10, in which the ordinate axis represents the voltage of the fuel cell 10 and the abscissa axis represents the current of the fuel cell 10. Generally, the V-I characteristics of a fuel cell are shown by a horizontal sigmoid curve that declines with an increase in current. Note that, in FIG. 3A and FIG. 3B, the abscissa axes of the respective graphs correspond to each other.

The control unit 20 prestores these W-I characteristics and V-I characteristics of the fuel cell 10 in a storage unit (not shown). The control unit 20 uses the W-I characteristics to acquire a target current It that should be output from the fuel cell 10 for an electric power Pt required from the external load 200. In addition, the control unit 20 uses the V-I characteristics to determine a target voltage Vt of the fuel cell 10 for outputting the target current It obtained from the W-I characteristics. The control unit 20 sets the target voltage Vt as a command value in the DC/DC converter 82 to cause the DC/DC converter 82 to regulate the voltage of the direct current power supply line DCL.

Incidentally, as described above, in the fuel cell 10, reaction gases flow via the manifolds into the gas flow passages of each power generating element 11. However, the gas flow passages of each power generating element 11 may possibly be blocked by water content, or the like, produced in the fuel cell 10. If the fuel cell 10 is caused to continue power generation In a state where the gas flow passages of part of the power generating elements 11 are blocked, power generation reaction is suppressed because of insufficient supply of reaction gases in the part of the power generating elements 11. On the other hand, in the other power generating elements 11, power generation reaction continues, so the part of the power generating elements 11 in which poor supply of reaction gases is occurring work as resistance in the fuel cell 10 to thereby generate negative voltage. Hereinafter, in the specification, the power generating element 11 in which negative voltage is generated is termed a "negative voltage cell 11".

It is known that, as the negative voltage state of each negative voltage cell 11 continues, deterioration of the power generation performance of the fuel cell 10 and degradation of the electrodes of each negative voltage cell 11 occur. Then, when negative voltage is generated in any one of the power generating elements 11 of the fuel cell 10, it is desirable to early eliminate the state where negative voltage is generated. Then, in the fuel cell system 100 according to the present embodiment, when negative voltage has been detected in any one of the power generating elements 11 of the fuel cell 10, the negative voltage state is recovered by executing the negative voltage recovery process described below.

Figure 4:
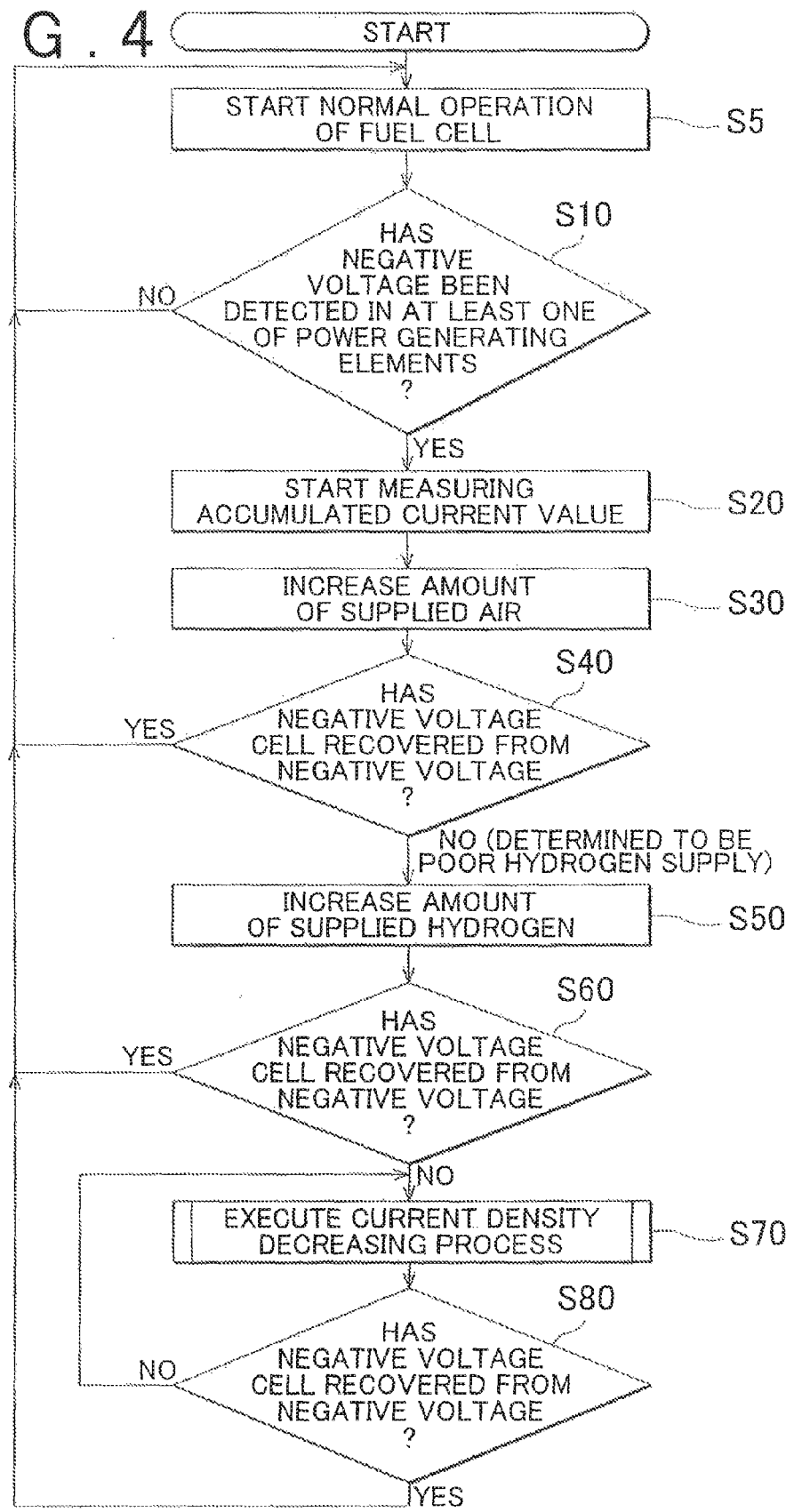
FIG. 4 is a flowchart for illustrating the procedure of a negative voltage recovery process according to the first embodiment of the invention.

FIG. 4 is a flowchart for illustrating the procedure of the negative voltage recovery process executed by the control unit 20. After normal operation of the fuel cell 10 (step S5) is started, when negative voltage has been detected in at least one of the power generating elements 11 by the cell voltage measuring unit 91, the control unit 20 starts the process in step S20 and the following steps (step S10). In step S20, the control unit 20 causes the accumulated current value measuring unit 21 to start measuring an accumulated current value used in a current density decreasing process (described later).

Here, at the stage where negative voltage has been detected in step S10, it is not determined whether the reason why negative voltage is generated is due to poor supply of hydrogen to the anode or due to poor supply of oxygen to the cathode. Then, in step S30, the control unit 20 initially increases the rotational speed of the air compressor 32 to increase the amount of air supplied to the fuel cell 10. If negative voltage is generated because of poor supply of oxygen to the cathode, this operation eliminates insufficient air supply in the negative voltage cell 11 and also scavenges the cathode-side gas flow passage to make it possible to remove the blockage.

If the voltage of the negative voltage cell 11 increases after the amount of supplied air is increased, the control unit 20 determines that the negative voltage cell 11 has recovered from negative voltage and then returns to normal operation control over the fuel cell 10 (YES in step S40). On the other hand, if the negative voltage cell 11 has not recovered from negative voltage even with an increase in the amount of supplied air, the control unit 20 determines that the reason why negative voltage is generated is due to poor hydrogen supply (NO in step S40).

Figure 5A:
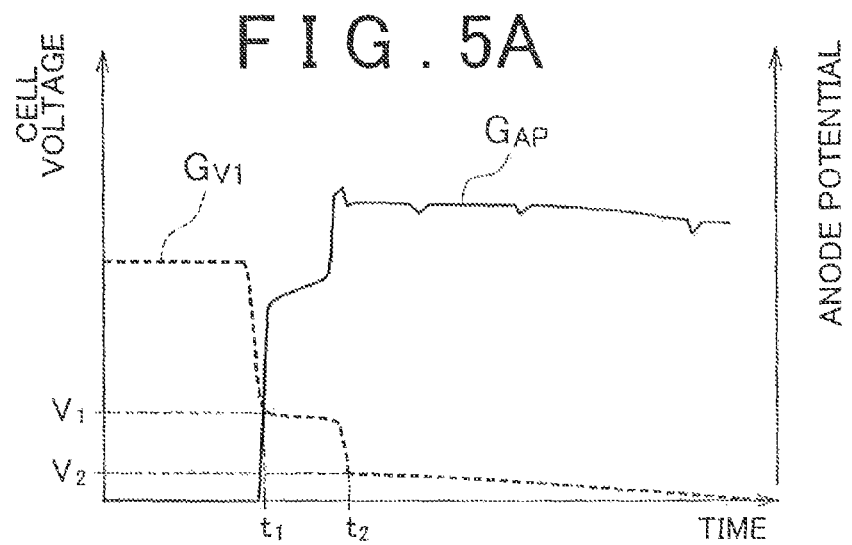
FIG. 5A to FIG. 5C are graphs for illustrating a recovery from negative voltage due to poor hydrogen supply according to the first embodiment of the invention.

FIG. 5A is a graph that shows a variation in electrode potential of the anode of the negative voltage cell 11 when negative voltage is generated because of poor hydrogen supply, which was observed in the experiment conducted by the inventors of the invention. In FIG. 5A, the solid line graph $G_{AP}$ shows a time variation in electrode potential of the anode, in which the ordinate axis represents the electrode potential of the anode and the abscissa axis represents time. In addition, in FIG. 5A, the broken line graph $G_{V1}$ shows a time variation in cell voltage of the negative voltage cell 11, in which the ordinate axis represents cell voltage and the abscissa axis represents time.

In the broken line graph $G_{V1}$, negative voltage occurs at time $t_1$, and the cell voltage decreases substantially vertically to the voltage value $V_1$. Then, after the voltage around the voltage value $V_1$ is maintained, the cell voltage further decreases substantially vertically to the voltage value $V_2$ at time $t_2$. On the other hand, in the solid line graph $G_{AP}$, as negative voltage occurs at time $t_1$, the potential of the anode of the negative voltage cell 11 increases substantially in contrast to a voltage variation of the negative voltage cell 11.

Here, during the period from time $t_1$ to time $t_2$, in the anode of the negative voltage cell 11, protons are produced by water-splitting reaction (oxidation reaction of water) expressed by the following reaction formula (1a). In addition, as described above, with an increase in anode potential when negative voltage is generated, the reaction expressed by the following reaction formula (1b) progresses, so the catalyst is oxidized to be deactivated, and protons are produced. Through these reactions, the fuel cell 10 is able to continue operation in a state where deterioration of the power generation performance is suppressed even in a state where negative voltage is generated.

$$2H_2O \rightarrow O_2 + 4H^+ + e^- \tag{1a}$$

$$Pt + 2H_2O \rightarrow PtO_2 + 4H^+ + 4e^- \tag{1b}$$

However, after time $t_2$, protons begin to be produced through oxidation of carbon that constitutes the anode by the reaction expressed by the following reaction formula (2). In this case, the power generation performance of the fuel cell 10 remarkably deteriorates because of degradation of electrode component members, and its recovery is difficult. In this way, when negative voltage occurs because of poor hydrogen supply, it is desirable that hydrogen is supplied to the negative voltage cell 11 to cause the negative voltage cell 11 to recover from negative voltage before the cell voltage of the negative voltage cell 11 decreases like the second decrease in voltage after time $t_2$.

$$C + 2H_2O \rightarrow CO_2 + 4H^+ + 4e^- \tag{2}$$

Then, in step S50 (FIG. 4), the control unit 20 regulates the driving interval or valve open duration of the injector 55 or increases the rotational speed of the hydrogen circulation pump 64 to increase the amount of hydrogen supplied to the fuel cell 10 to thereby attempt to recover from negative voltage. However, the inventors of the invention found that there is a case where the negative voltage cell 11 does not recover from the negative voltage state even when hydrogen is supplied to the negative voltage cell 11.

Figure 5B:
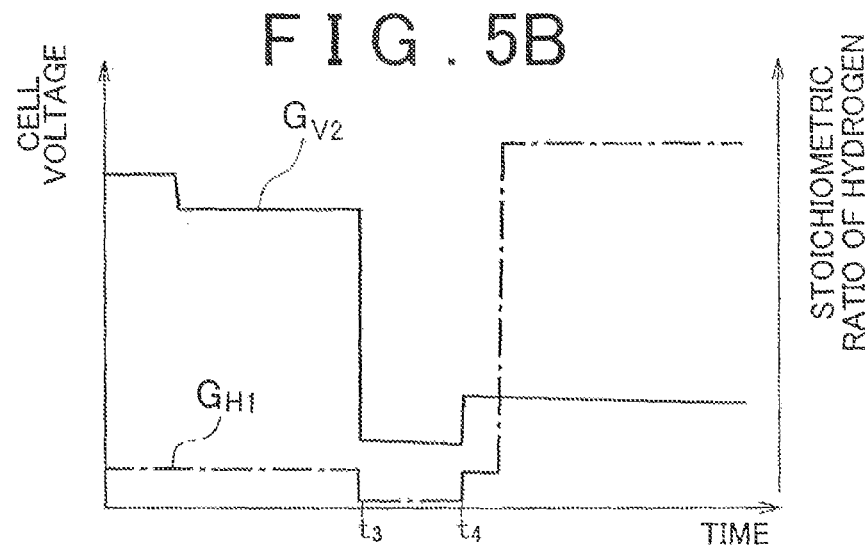
Figure 5C:
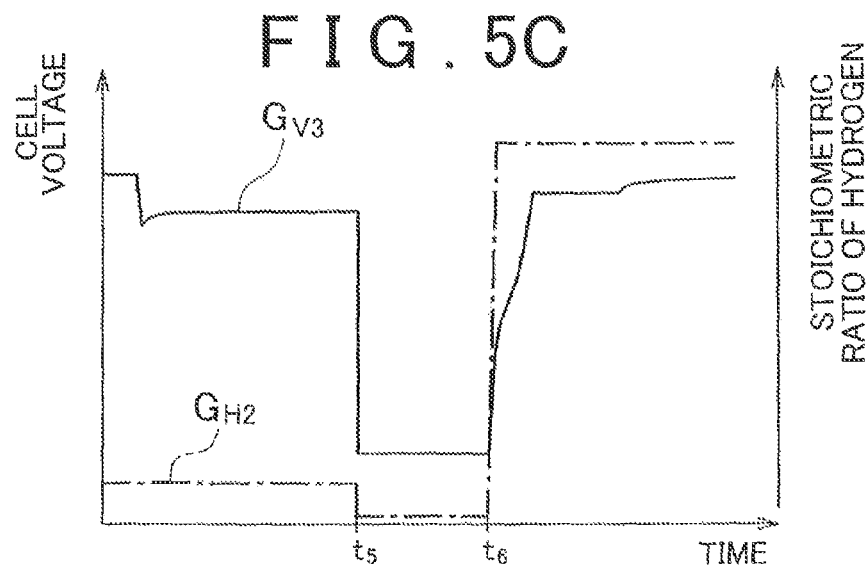

FIG. 5B and FIG. 5C are graphs that show the experimental results that demonstrate that there are cases where the negative voltage cell 11 recovers from negative voltage and the negative voltage cell 1 does not recover from negative voltage by increasing the amount of supplied hydrogen. FIG. 5B is a graph that shows a time variation in cell voltage of the negative voltage cell 11 when the amount of hydrogen supplied to the fuel cell 10 was increased after negative voltage occurred in the fuel cell 10. FIG. 5B was obtained through the experiment conducted by the inventors of the invention. In FIG. 5B, the solid line graph $G_{V2}$ shows a time variation in voltage of the negative voltage cell 11, in which the ordinate axis represents cell voltage and the abscissa axis represents time. In FIG. 5B, the broken line graph $G_{H1}$ shows a time variation in stoichiometric ratio of hydrogen, in which the ordinate axis represents the stoichiometric ratio of hydrogen and the abscissa axis represents time. Here, the "stoichiometric ratio of hydrogen" means the ratio of the actual amount of supplied hydrogen to theoretically required hydrogen (theoretical consumption of hydrogen) against the amount of electric power generated by the fuel cell.

As shown in the graph of FIG. 5B, negative voltage occurred at time $t_3$. Then, after the process of increasing the amount of supplied hydrogen, the stoichiometric ratio of hydrogen in the negative voltage cell 11 began to increase at time $t_4$; however, the cell voltage of the negative voltage cell 11 just slightly increased and did not recover to the voltage level before negative voltage occurred. In this way, in the experiment conducted by the inventors of the invention, it was observed that there is a case where the cell voltage of the negative voltage cell 11 does not recover from negative voltage even when the stoichiometric ratio of hydrogen in the negative voltage cell 11 is increased after negative voltage occurs.

FIG. 5C is a graph similar to FIG. 5B and shows a time variation in cell voltage of the negative voltage cell 11 when the amount of hydrogen supplied to the fuel cell 10 was increased after negative voltage occurred in the fuel cell 10. In FIG. 5C, the solid line graph $G_{V3}$ shows a time variation in voltage of the negative voltage cell 11, in which the ordinate axis represents cell voltage and the abscissa axis represents time. In FIG. 5C, the broken line graph $G_{H2}$ shows a time variation in stoichiometric ratio of hydrogen, in which the ordinate axis represents the stoichiometric ratio of hydrogen and the abscissa axis represents time.

Here, in the experiment of FIG. 5C, after negative voltage occurred at time $t_5$, the stoichiometric ratio of hydrogen was increased to the same level as that of FIG. 5B at time $t_6$, and the current density of the fuel cell 10 was decreased to about 1/10 of the current density before negative voltage occurred. Then, as shown in the graph of FIG. 5C, the voltage of the negative voltage cell 11 was able to be recovered to the voltage level before negative voltage occurred. The inventors of the invention gained the following consideration from these experiments of FIG. 5B and FIG. 5C.

FIG. 6A to FIG. 6D are views for illustrating the reason why a negative voltage cell can recover from negative voltage owing to a decrease in current density. FIG. 6A to FIG. 6D are views that schematically show the internal state of the anode of each power generating element 11, and schematically show a carbon atom 1, catalysts 2 supported on the carbon atom 1 and an ionomer 3 that covers the carbon atom 1 and the catalysts 2.

Figure 6A:
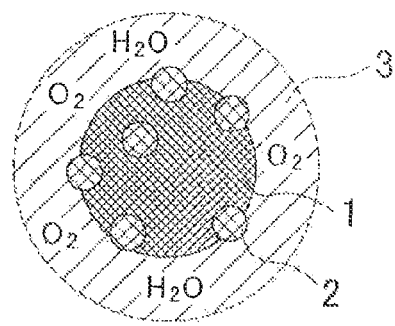
FIG. 6A to FIG. 6D are views for illustrating the reason why a negative voltage cell can recover from negative voltage owing to a decrease in current density according to the first embodiment of the invention.

FIG. 6A shows the internal state of the anode of the negative voltage cell 11 in which negative voltage is generated because of poor hydrogen supply. As described above, when negative voltage occurs because of poor hydrogen supply, protons and oxygen are produced through water-splitting reaction expressed by the above reaction formula (1a). Therefore, when the fuel cell 10 continues power generation in a state where negative voltage is generated, a large number of molecules of oxygen appear near the catalysts 2.

Figure 6B:
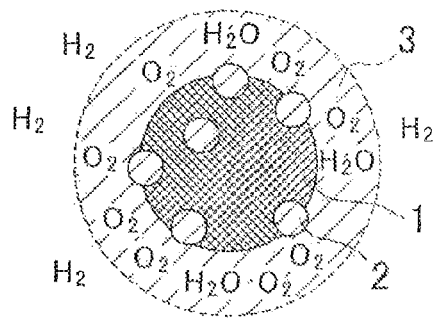

FIG. 6B schematically shows the state of the anode of the negative voltage cell 11 when the stoichiometric ratio of hydrogen is increased after negative voltage occurs. As hydrogen begins to reach the anode of the negative voltage cell 11, the hydrogen reacts with oxygen produced in the anode till then to produce water (the following reaction formula (3)). In addition, the above water-splitting reaction also continues.

$$H_2 + \tfrac{1}{2}O_2 \rightarrow H_2O \qquad (3)$$

Here, in the specification, the amount of oxygen per unit time, produced through the above water-splitting reaction, is termed "oxygen production rate". In addition, the amount of oxygen per unit time, combined with hydrogen to be consumed in the water-forming reaction expressed by the above reaction formula (3), is termed "oxygen consumption rate".

Figure 6C:
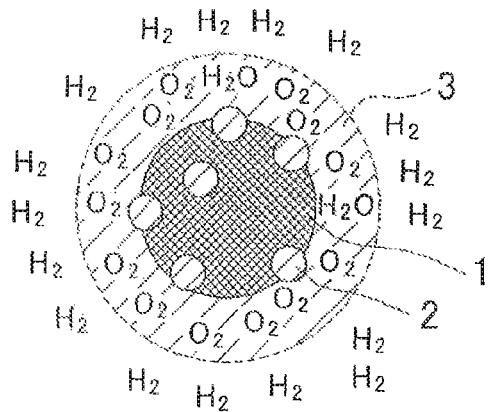

After hydrogen begins to reach the negative voltage cell 11, when the oxygen production rate in the anode of the negative voltage cell 11 is higher than the oxygen consumption rate in the anode of the negative voltage cell 11, the amount of oxygen near the catalysts 2 continuously increases in the anode of the negative voltage cell 11 (FIG. 6C). Thus, in this case, it is difficult for hydrogen to reach the catalysts 2, so water-splitting reaction continues and the negative voltage state continues.

Figure 6D:
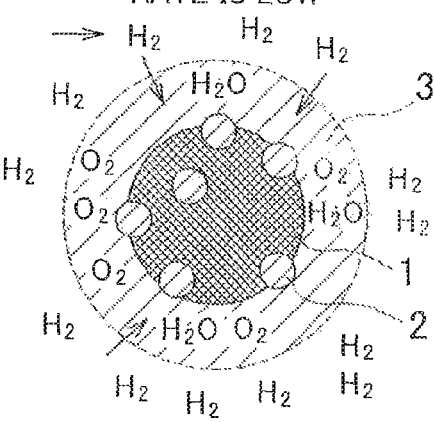

On the other hand, after hydrogen begins to reach the negative voltage cell 11, when the oxygen consumption rate in the anode of the negative voltage cell 11 is higher than the oxygen production rate in the anode of the negative voltage cell 11, the amount of oxygen near the catalysts 2 is reduced (FIG. 6D). Thus, it is easy for hydrogen to reach the catalysts 2, so normal power generation reaction is resumed.

Here, according to Faraday's law, as the current density of the fuel cell 10 increases, the oxygen production rate increases. That is, in the experiment of FIG. 5B, it is understood that, because the current density of the fuel cell 10 was high, the oxygen production rate in the anode of the negative voltage cell 11 was higher than the oxygen consumption rate in the anode of the negative voltage cell 11, so the negative voltage cell 11 had not recovered from negative voltage. On the other hand, in the experiment of FIG. 5C, it is understood that, because the current density of the fuel cell 10 was low, the oxygen production rate in the anode of the negative voltage cell 11 was lower than the oxygen consumption rate in the anode of the negative voltage cell 11, so the negative voltage cell 11 had recovered from negative voltage.

Then, in the fuel cell system 100 according to the first embodiment, after hydrogen supply amount increasing process in step S50 (FIG. 4), it is determined whether the negative voltage cell 11 has recovered from negative voltage (step S60). Then, when the negative voltage cell 11 has recovered from negative voltage, normal operation control over the fuel cell 10 (step S5) is resumed; whereas, when the negative voltage cell 11 has not recovered from negative voltage, the current density decreasing process of step S70 is executed. In the current density decreasing process, a threshold of current density (referred to as "current density threshold") at or below which the oxygen production rate in the anode of the negative voltage cell 11 may be decreased with respect to the oxygen consumption rate is obtained, and then the current density of the fuel cell 10 is decreased using the current density threshold to thereby attempt to recover from negative voltage.

Figure 7:
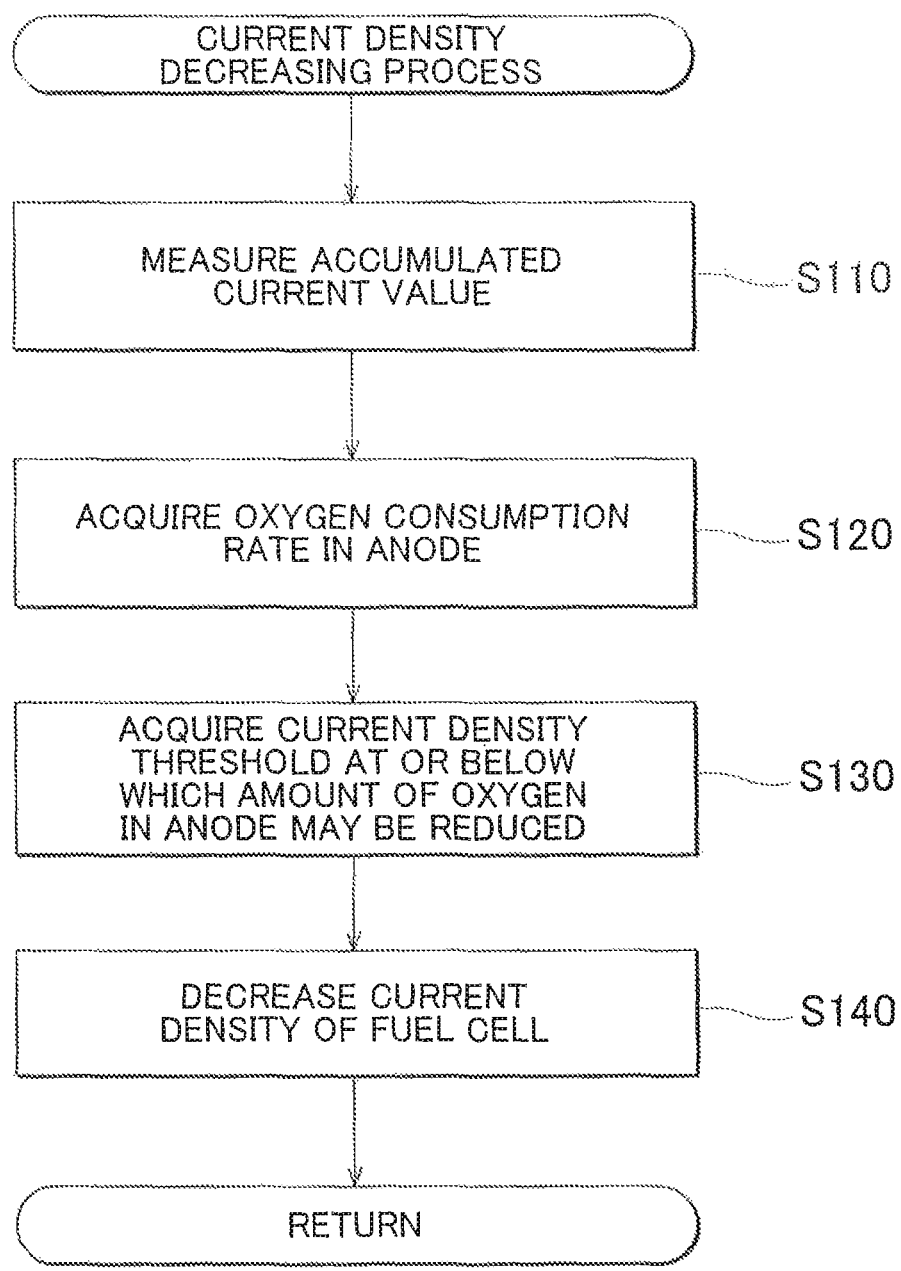
FIG. 7 is a flowchart that illustrates the procedure of a current density decreasing process according to the first embodiment of the invention.

FIG. 7 is a flowchart that shows the procedure of the current density decreasing process in step S70. In step S110, the control unit 20 acquires an accumulated current value in a period during which negative voltage is generated, which is measured by the accumulated current value measuring unit 21. Here, the reason why the accumulated current value is acquired is as follows.

As described above, when negative voltage is generated because of poor hydrogen supply, protons are produced by water-splitting reaction (the above described reaction formula (1a)), and oxidation reaction of the catalyst (the above described reaction formula (1b)) progresses. That is, as the electric charge (accumulated current value) output from the fuel cell 10 in a period during which negative voltage is generated increases, the degree of deactivation of the catalyst increases, so consumption of oxygen through recombination of hydrogen and oxygen is suppressed. Thus, when the correlation between an accumulated current value and an oxygen consumption rate in a period during which negative voltage is generated is obtained in advance, the oxygen consumption rate in the anode of the negative voltage cell 11 may be obtained using the accumulated current value acquired in step S110.

Figure 8A:
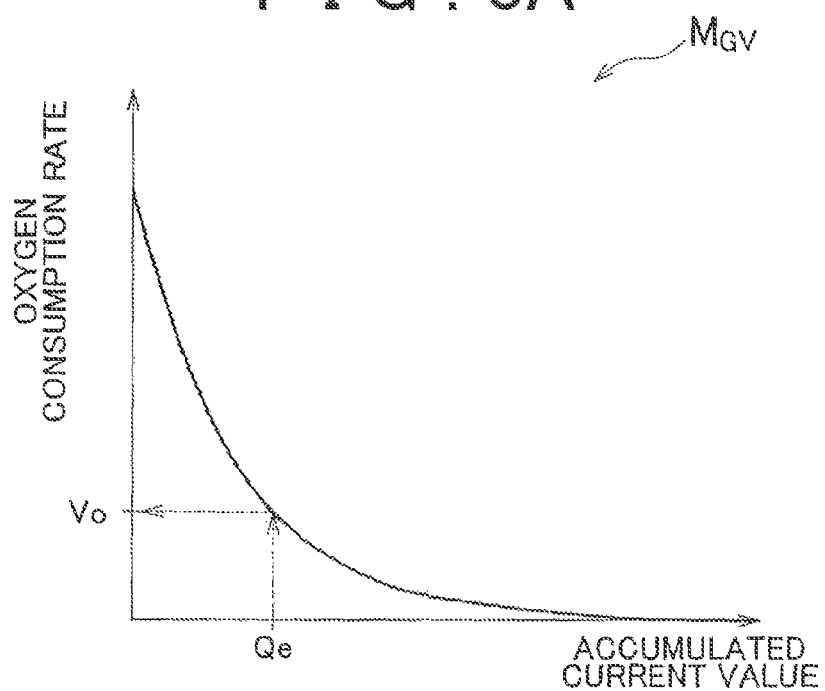
FIG. 8A and FIG. 8B are graphs for respectively illustrating an oxygen consumption rate map and a current density threshold map according to the first embodiment of the invention.

FIG. 8A is a graph that shows an example of an oxygen consumption rate map $M_{GV}$ in order to acquire the oxygen consumption rate in the anode of the negative voltage cell 11 in step S120. In FIG. 8A, the oxygen consumption rate map $M_{GV}$ is shown as a downward-convex decline curve when the ordinate axis represents an oxygen consumption rate and the abscissa axis represents an accumulated current value. The correlation between an accumulated current value and an oxygen consumption rate, set in the oxygen consumption rate map $M_{GV}$, may be, for example, obtained on the basis of the following experiment.

That is, the anode-side gas flow passage of any one of the power generating elements 11 of the fuel cell 10 is blocked to generate negative voltage for a certain period of time, and then power generation is stopped. The accumulated current value in this period is obtained, and the amount of oxygen produced in this period is obtained from the amount of electric power generated by the negative voltage cell 11. Then, supply of hydrogen to the anode of that negative voltage cell 11 is started, and an oxygen consumption time from when supply of hydrogen is started to when the oxygen partial pressure in the anode of the negative voltage cell 11 becomes zero is measured. The series of measuring processes is carried out in a different period during which negative voltage is generated. From these results of measurement, the oxygen consumption rate is calculated for each accumulated current value.

The control unit 20 prestores the oxygen consumption rate map $M_{GV}$ in the storage unit (not shown). Then, in step S120, the control unit 20 consults the oxygen consumption rate map $M_{GV}$ to obtain an oxygen consumption rate Vo corresponding to the accumulated current value Qe acquired in step S110.

Figure 8B:
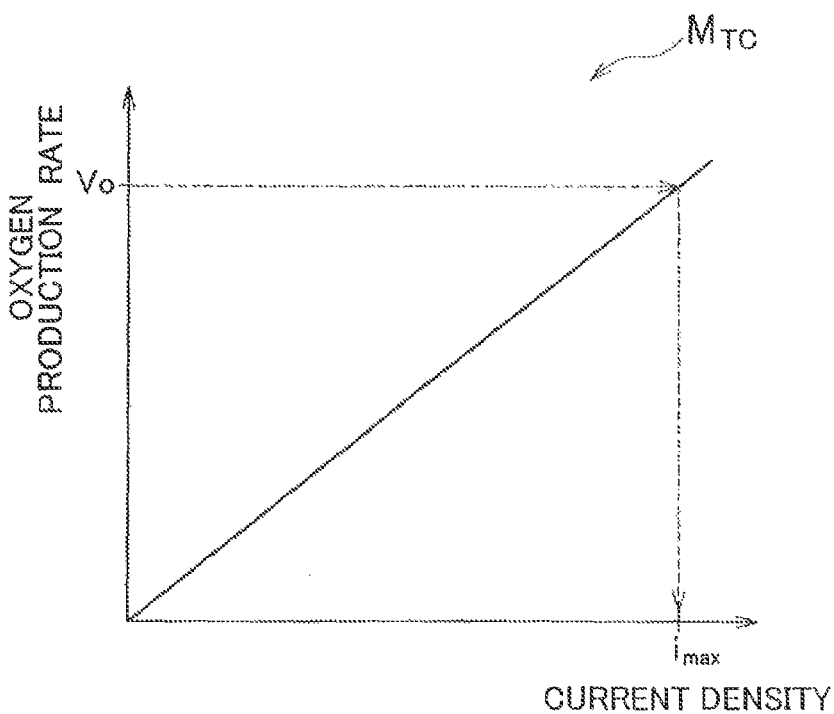

FIG. 8B is a graph that shows an example of a current density threshold map $M_{TC}$ that is used in order to acquire a current density threshold in step S130. In FIG. 8B, the current density threshold map $M_{TC}$ is shown as a directly proportional graph in which the oxygen production rate increases with an increase in current density where the ordinate axis represents an oxygen production rate and the abscissa axis represents an accumulated current value. The correlation between an oxygen production rate and a current density in the current density threshold map $M_{TC}$ is obtained on the basis of Faraday's law.

The control unit 20 prestores the current density threshold map $M_{TC}$ in the storage unit (not shown). Then, in step S130, the control unit 20 consults the oxygen consumption rate map $M_{GV}$ to obtain a current density corresponding to the oxygen production rate Vo equivalent to the oxygen consumption rate Vo acquired in the previous step as a current density threshold $i_{max}$.

When the fuel cell 10 is caused to generate electric power at a current density that is lower than the current density threshold $i_{max}$, the oxygen production rate in the anode of the negative voltage cell 11 may be decreased with respect to the oxygen consumption rate, so the amount of oxygen produced in the anode of the negative voltage cell 11 may be gradually reduced. Thus, it is possible to recover from negative voltage through supply of hydrogen.

In step S140 (FIG. 7), the control unit 20 causes the fuel cell 10 to generate electric power at a current density ($i_{max}-\Delta i$) that is obtained by subtracting a predetermined value $\Delta i$ ($\Delta i>0$) from the current density threshold $i_{max}$ for a preset period. After the control unit 20 executes the current density decreasing process, the control unit 20 executes determination process as to whether the negative voltage cell 11 has recovered from negative voltage in step S80 (FIG. 4). When the negative voltage cell 11 has recovered from negative voltage, the control unit 20 resumes normal operation control over the fuel cell 10 (step S5). Then, when the negative voltage cell 11 has not recovered from negative voltage through the current density decreasing process, the control unit 20 repeats the current density decreasing process again.

In this way, with the fuel cell system 100 according to the first embodiment, when negative voltage has been detected in part of the power generating elements 11, recovery process for recovering from the negative voltage is executed. Then, in the recovery process, when the part of the power generating elements 11 have not recovered from negative voltage even when the amount of supplied hydrogen is increased, the current density decreasing process for decreasing the production rate of oxygen that inhibits a recovery from the negative voltage is executed. Thus, even when negative voltage is generated in the fuel cell 10, it is possible to suppress degradation of the fuel cell 10 and deterioration of the power generation performance of the fuel cell 10.

Figure 9:
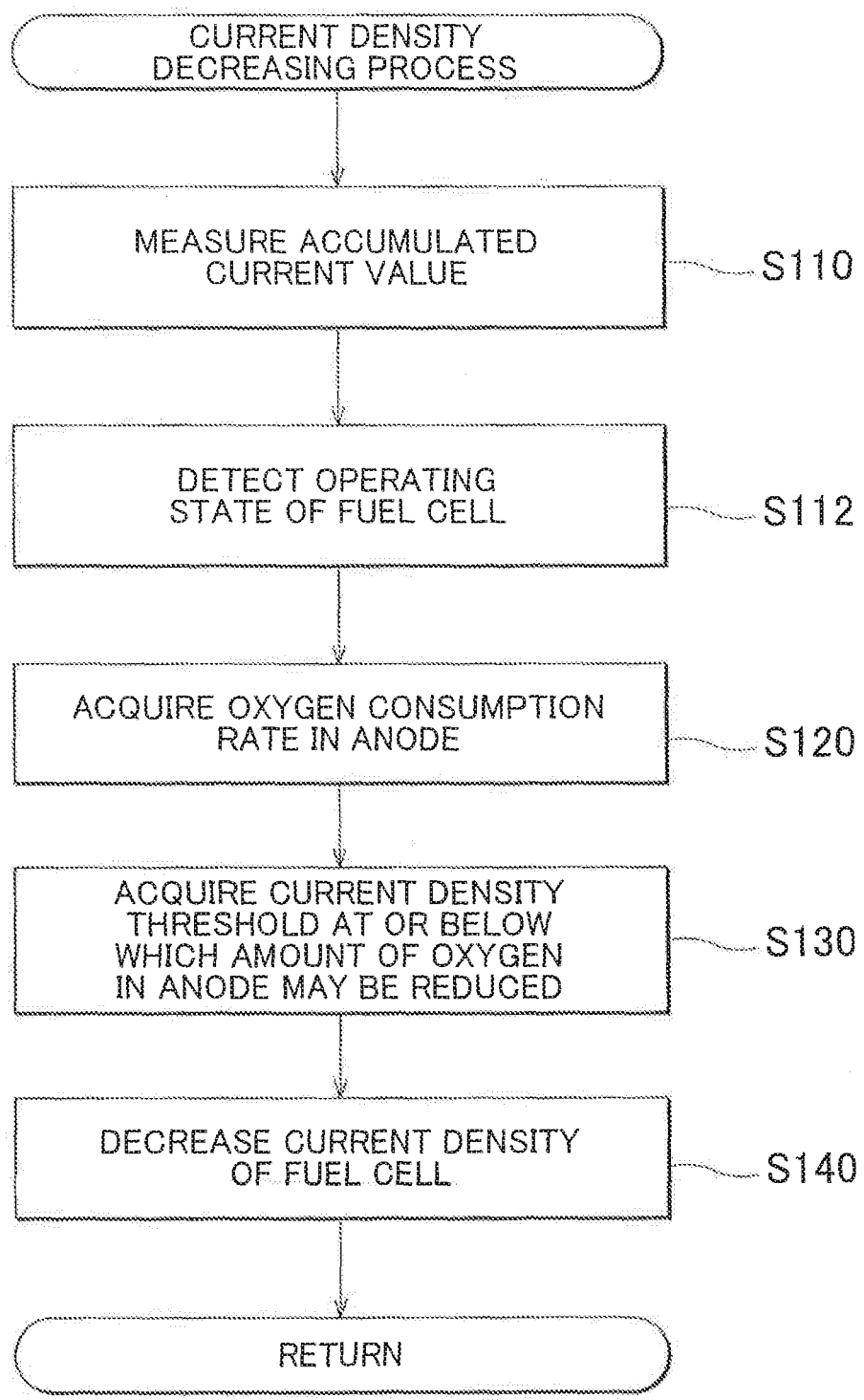
FIG. 9 is a flowchart that illustrates the procedure of a current density decreasing process according to a second embodiment of the invention.

FIG. 9 is a flowchart, that shows the procedure of a current density decreasing process executed in a fuel cell system according to a second embodiment. FIG. 9 is substantially the same as FIG. 7 except that step S112 is added. Note that the other configuration of the fuel cell system according to the second embodiment is similar to that of the fuel cell system 100 according to the first embodiment, and the negative voltage recovery process is also executed in a similar manner to that described in the first embodiment (FIG. 1, FIG. 2, FIG. 4). However, in the fuel cell system according to the second embodiment, the fuel cell 10 is operated at a preset constant operating temperature.

In step S110, an accumulated current value in a period during which negative voltage is generated is measured. In step S112, the control unit 20 detects the humidity inside the fuel cell 10 as the operating state of the fuel cell 10. Specifically, the control unit 20 acquires the humidity inside the fuel cell 10 on the basis of the impedance measured by the impedance measuring unit 93.

Figure 10A:
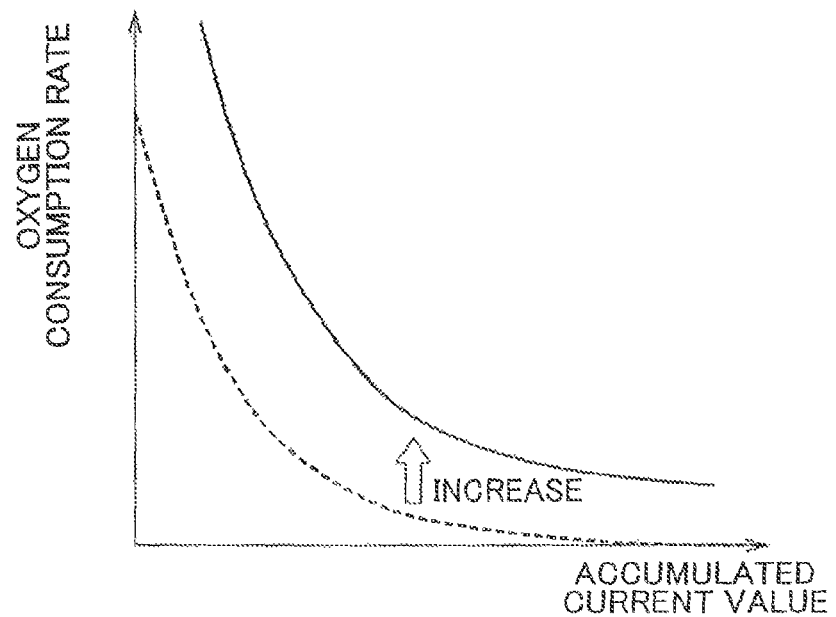
FIG. 10A and FIG. 10B are graphs for illustrating an oxygen consumption rate map according to the second embodiment of the invention.

FIG. 10A is a graph that shows a variation in the correlation between an accumulated current value and an oxygen consumption rate with a variation in humidity inside the fuel cell 10. The graph shown in FIG. 10A is a graph that is similar to the graph of FIG. 8A and that is obtained from the fuel cell 10 inside which the humidity is decreased. Note that, in the graph of FIG. 10A, for the sake of convenience, the broken line graph indicates the graph of FIG. 8A and the arrow indicates a change from the broken line graph.

As is described in the first embodiment, oxidation reaction of the catalyst, expressed by the above described reaction formula (1b), progresses in the anode of the negative voltage cell 11 in which negative voltage is generated because of poor hydrogen supply. The oxidation reaction of the catalyst occurs with a molecule of water near the catalyst, so, when the amount of water content contained in the membrane electrode assembly of the negative voltage cell 11 decreases, the progress of the oxidation reaction is suppressed.

That is, in response to the humidity inside the fuel cell 10, the rate at which the catalyst is deactivated in the anode of the negative voltage cell 11 varies, and then the oxygen consumption rate also varies accordingly. Then, in the fuel cell system according to the second embodiment, the prepared map is used to acquire an appropriate oxygen consumption rate on the basis of the accumulated current value acquired in step S110 and the humidity inside the fuel cell 10, acquired in step S112 (step S120).

Figure 10B:
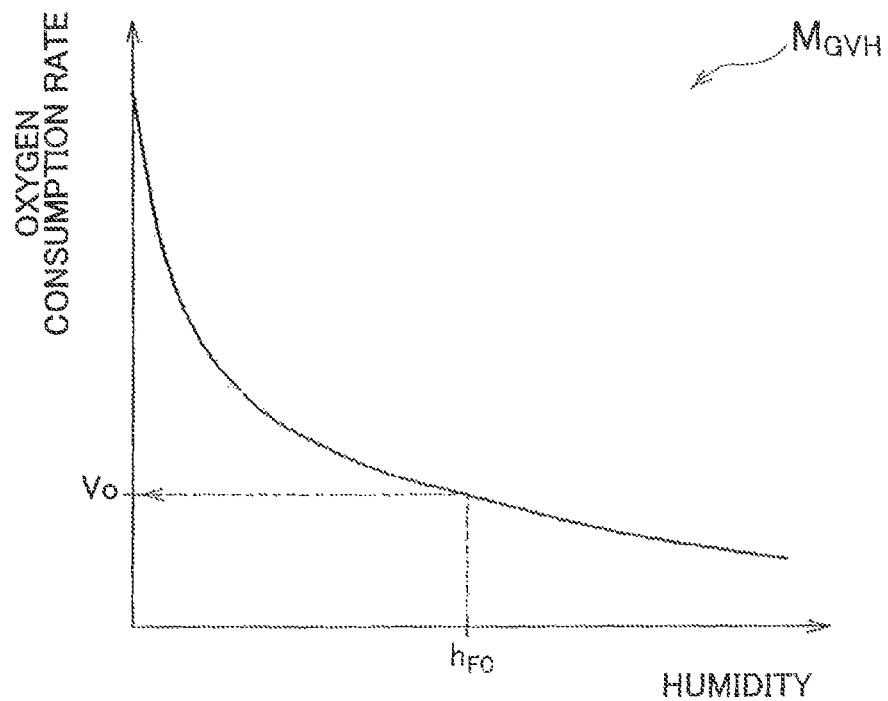

FIG. 10B is a graph that shows an example of an oxygen consumption rate map $M_{GVH}$ that the control unit 20 stores in the storage unit in the fuel cell system according to the second embodiment. In FIG. 10B, the oxygen consumption rate map $M_{GVH}$ is shown by the graph of which the ordinate axis represents an oxygen consumption rate and the abscissa axis represents a humidity. In the second embodiment, the control unit 20 has the oxygen consumption rate map $M_{GVH}$ for each accumulated current value. The control unit 20 selects the oxygen consumption rate map $M_{GVH}$ corresponding to the accumulated current value acquired in step S110, and then uses the oxygen consumption rate map $M_{GVH}$ to acquire the oxygen consumption rate Vo corresponding to a humidity $h_{FC}$ inside the fuel cell 10 in step S120.

In step S130, the oxygen consumption rate Vo and the current density threshold map $M_{TC}$ (FIG. 8B) described in the first embodiment are used to determine the current density threshold $i_{max}$. Then, in step S140, the fuel cell 10 is caused to generate electric power at a current density of the fuel cell 10, which is decreased on the basis of the current density threshold $i_{max}$.

In this way, with the fuel cell system according to the second embodiment, it is possible to acquire a further appropriate oxygen consumption rate on the basis of the humidity inside the fuel cell 10. Thus, it is possible to further appropriately execute the current density decreasing process for recovering from negative voltage.

Figure 11A:
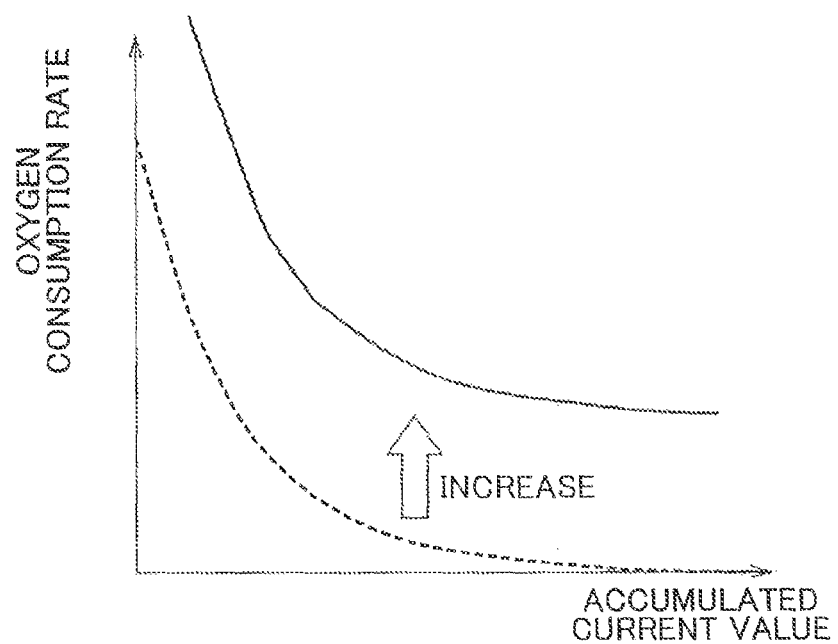
FIG. 11A and FIG. 11B are graphs for illustrating another configuration example of the second embodiment of the invention.
Figure 11B:
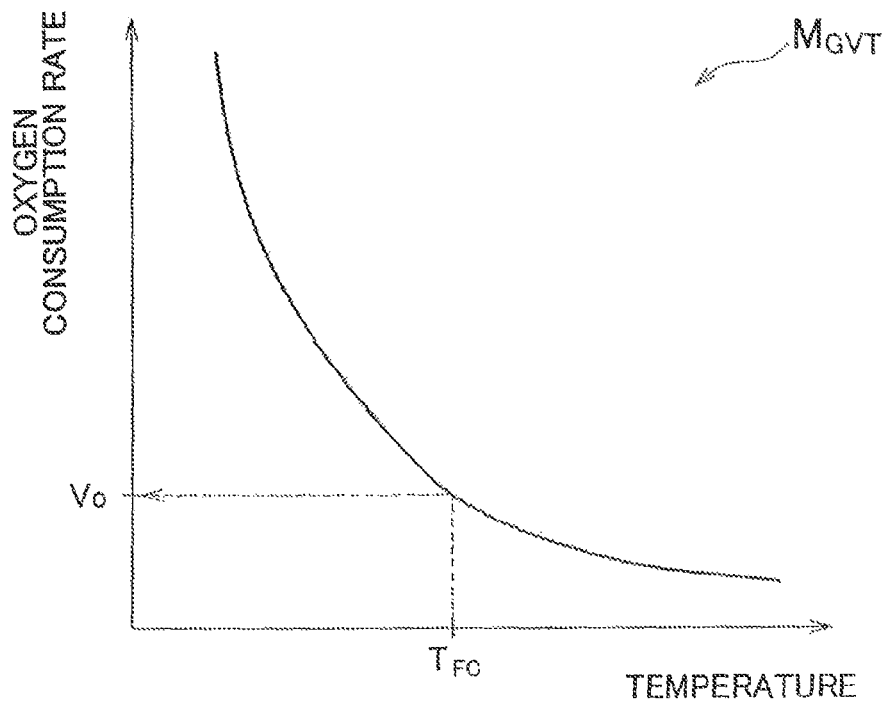

FIG. 11A and FIG. 11B are graphs for illustrating another configuration of the second embodiment. Note that, in this configuration example, the configuration of the fuel cell system is the same as the configuration of the above described second embodiment (FIG. 1, FIG. 2), and the negative voltage recovery process and the current density decreasing process executed in the negative voltage recovery process may be similarly executed (FIG. 4, FIG. 9). However, in the fuel cell system according to this configuration example, the fuel cell 10 is operated so as to maintain the humidity inside the fuel cell 10 at a constant preset humidity.

FIG. 11A is a graph that shows a variation in the correlation between an accumulated current value and an oxygen consumption rate with a variation in operating temperature of the fuel cell 10. The graph shown in FIG. 11A is a graph that is similar to the graph of FIG. 8A and that is obtained from the fuel cell 10 of which the operating temperature is decreased. Note that, in the graph of FIG. 11A, for the sake of convenience, the broken line graph indicates the graph of FIG. 8A and the arrow indicates a change from the broken line graph.

The oxidation reaction (reaction formula (1b)) of the catalyst, which progresses in the anode of the negative voltage cell 11 in which negative voltage is generated because of poor hydrogen supply, progresses more gently as the operating temperature of the fuel cell 10 decreases (Arrhenius equation). That is, the degree of activation of the catalyst in the anode of the negative voltage cell 11 varies depending on the operating temperature of the fuel cell 10, so the oxygen consumption rate also varies.

Then, in this configuration example, in step S112 of FIG. 9, the operating temperature of the fuel cell 10 is detected as the operating state of the fuel cell 10, instead of the humidity inside the fuel cell 10. Specifically, the control unit 20 measures the operating temperature of the fuel cell 10 on the basis of the values measured by the two refrigerant temperature measuring units 74 and 75 of the refrigerant supply unit 70. Then, the control unit 20 uses the prepared map to acquire an appropriate oxygen consumption rate on the basis of the accumulated current value acquired in step S110 and the operating temperature acquired in step S112 (step S120).

FIG. 11B is a graph that shows an example of an oxygen consumption rate map $M_{GVT}$ that the control unit 20 stores in the storage unit in the fuel cell system according to another configuration example of the second embodiment. In FIG. 11B, the oxygen consumption rate map $M_{GVT}$ is shown by the graph of which the ordinate axis represents an oxygen consumption rate and the abscissa axis represents an operating temperature. Note that the control unit 20 has the oxygen consumption rate map $M_{GVT}$ for each accumulated current value.

In step S120, the control unit 20 selects the oxygen consumption rate map $M_{GVH}$ corresponding to the accumulated current value acquired in step S110, and then uses the oxygen consumption rate map $M_{GVT}$ to acquire the oxygen consumption rate Vo corresponding to an operating temperature $T_{FC}$ of the fuel cell 10. Then, in step S130, the control unit 20 uses the current density threshold map $M_{TC}$ (FIG. 8B) to acquire the current density threshold corresponding to the oxygen consumption rate Vo. In this way, even when the oxygen consumption rate is acquired on the basis of the operating temperature of the fuel cell 10, as in the case where the oxygen consumption rate is acquired on the basis of the humidity inside the fuel cell 10, it is possible to further appropriately acquire the oxygen consumption rate.

Note that, when the fuel cell system executes control for changing the wet state inside the fuel cell 10 and changing the operating temperature of the fuel cell 10 at the time of operation of the fuel cell 10, the control unit 20 may be configured to acquire an oxygen consumption rate on the basis of a detected humidity inside the fuel cell 10 and a detected operating temperature. In this case, it is applicable that the control unit 20 prestores, in the storage unit, the oxygen consumption rate map $M_{GV}$ that shows the correlation between an accumulated current value and an oxygen consumption rate for each combination of the detected humidity inside the fuel cell 10 and the detected operating temperature, and then uses those maps to acquire an oxygen consumption rate.

Figure 12:
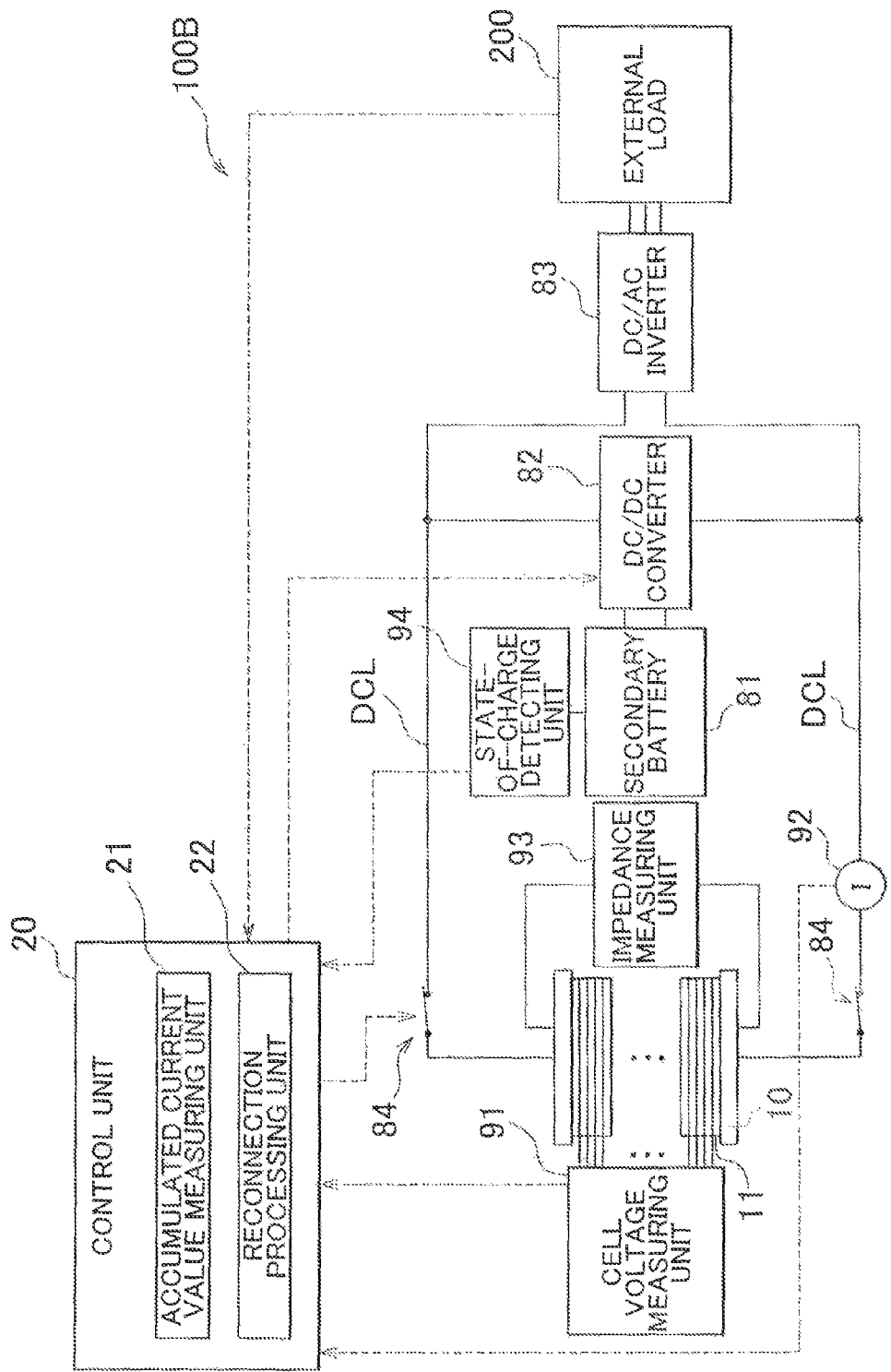
FIG. 12 is a schematic view that shows the electrical configuration of a fuel cell system according to a third embodiment of the invention.

FIG. 12 is a schematic view that shows the electrical configuration of a fuel cell system 100B according to a third embodiment of the invention. FIG. 12 is substantially the same as FIG. 2 except that the control unit 20 includes a reconnection processing unit 22 and an on-off switch 84 is provided in the direct current power supply line DCL. Note that the other configuration of the fuel cell system 100B according to the third embodiment is substantially the same as that of the fuel cell system 100 according to the first embodiment. In addition, the fuel cell system 100B according to the third embodiment executes negative voltage recovery process similar to that executed by the fuel cell system 100 according to the first embodiment (FIG. 4, FIG. 7).

In the fuel cell system 100B according to the third embodiment, when the negative voltage cell 11 has not recovered from negative voltage in the negative voltage recovery process and degradation of the fuel cell 10 may possibly occur, the reconnection processing unit 22 executes reconnection process (described later) to thereby attempt to recover from negative voltage. The on-off switch 84 opens or closes in response to a command from the reconnection processing unit 22. The on-off switch 84 turns on or off the electrical connection between the fuel cell 10 and the external load 200.

Figure 13:
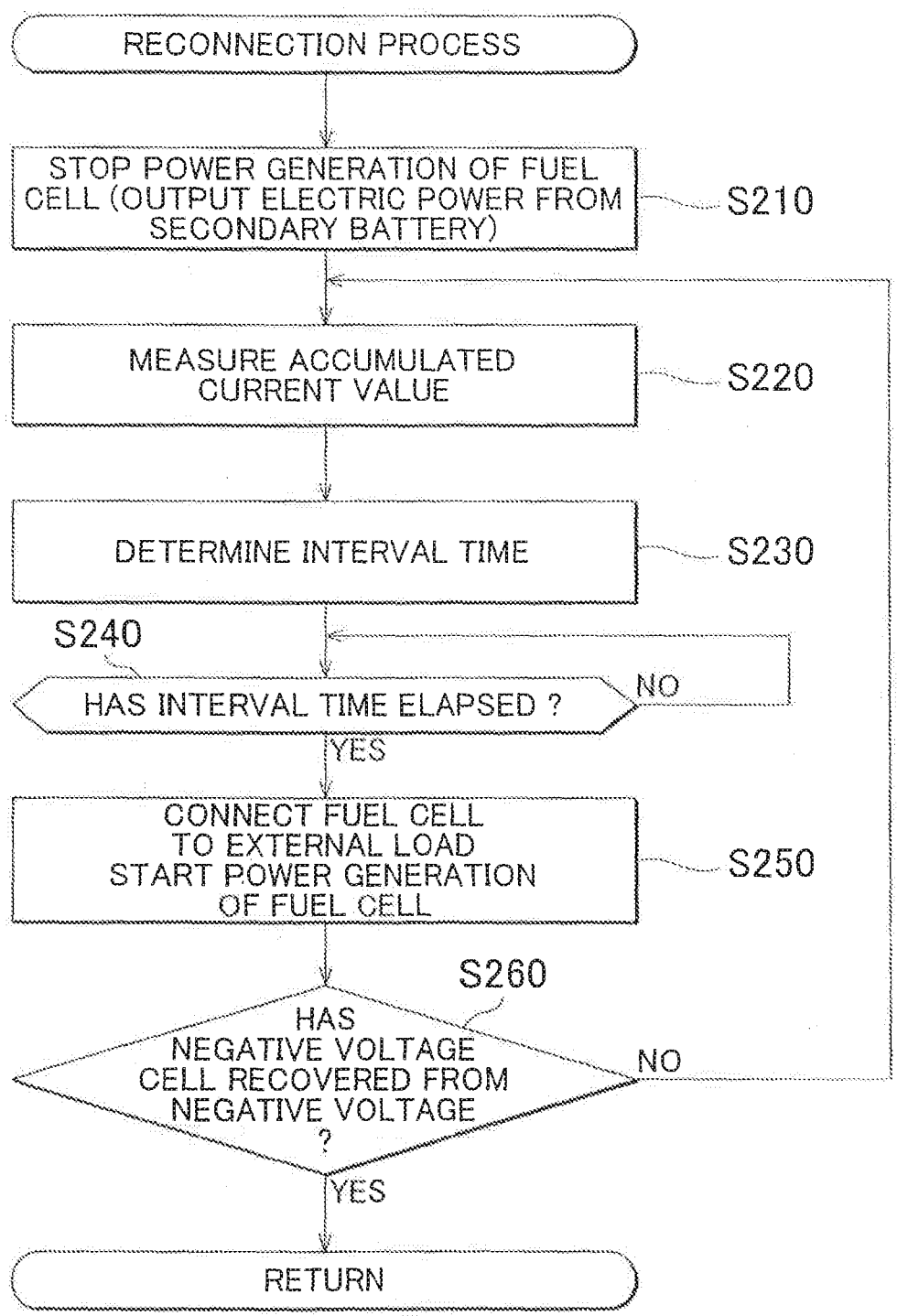
FIG. 13 is a flowchart that illustrates the procedure of a reconnection process according to the third embodiment of the invention.

FIG. 13 is a flowchart that shows the procedure of the reconnection process executed by the reconnection processing unit 22 in the fuel cell system 100B according to the third embodiment. The reconnection process is executed in order to avoid degradation of the anode of the negative voltage cell 11 when the current density threshold $i_{max}$ is smaller than or equal to a predetermined threshold in step S120 of the current density decreasing process (FIG. 7). Note that it is applicable that the reconnection process may be executed in step S80 of the negative voltage recovery process (FIG. 4) when the negative voltage cell 11 has not recovered from negative voltage even when the current density decreasing process is repeated a predetermined number of times.

In step S210, the reconnection processing unit 22 opens the on-off switch 84 to interrupt electrical connection between the fuel cell 10 and the external load 200. Note that, in this step and the following steps, electric power is supplied from the secondary battery 81 to the external load 200. In step S220, the reconnection processing unit 22 acquires, from the accumulated current value measuring unit 21, an accumulated current value in a period from when measuring of step S20 is started in the negative voltage recovery process (FIG. 4) to when the fuel cell 10 is electrically interrupted from the external load 200 in step S210 in the reconnection process (FIG. 13). Then, in step S230, an interval time up to when the fuel cell 10 is connected to the external load 200 again is determined on the basis of the accumulated current value.

Figure 14:
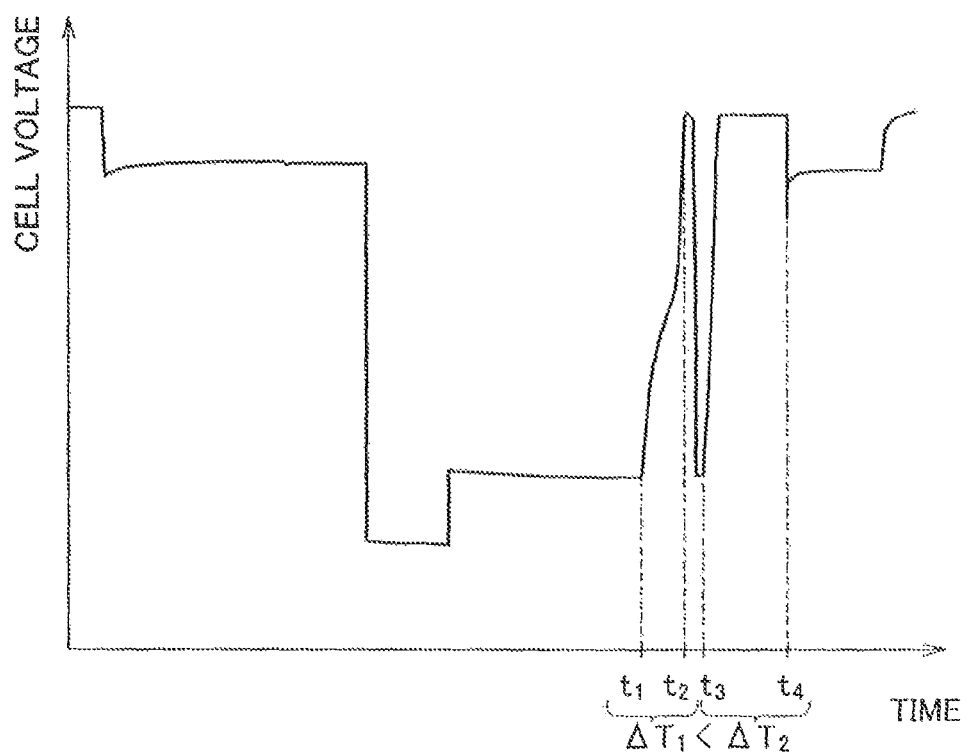
FIG. 14 is a graph for illustrating a time variation in cell voltage in a negative voltage cell according to the third embodiment of the invention.

FIG. 14 is a graph that shows a time variation in cell voltage of the negative voltage cell 11, observed in the experiment conducted by the inventors of the invention, where the ordinate axis represents cell voltage and the abscissa axis represents time. In this experiment, the anode-side gas flow passage of any one of the power generating elements 11 of the fuel cell 10 was blocked to generate negative voltage, and then the fuel cell 10 was caused to continue power generation in that state. Then, in that negative voltage state, while the amount of supplied hydrogen was increased, interruption and reconnection of the electrical connection between the fuel cell 10 and the external load 200 were repeated twice.

When the first interruption was carried out at time $t_1$, the cell voltage of the negative voltage cell 11 was recovered to the level before negative voltage occurred. Then, when the fuel cell 10 was electrically reconnected to the external load 200 at time $t_2$ after a time interval $\Delta T_1$, the cell voltage of the negative voltage cell 11 immediately steeply decreased to the original level of negative voltage.

After that, the second interruption was earned out at time $t_3$. Through this interruption as well, the cell voltage of the negative voltage cell 11 was recovered to the level before negative voltage occurred. Then, the fuel cell 10 was electrically reconnected to the external load 200 at time $t_4$ after a time interval $\Delta T_2$ longer than the previous time interval $\Delta T_1$. The cell voltage after the reconnection slightly decreased at the time of the reconnection but immediately recovered to the level before negative voltage occurred.

In this way, when negative voltage is generated because of poor hydrogen supply, electrical connection between the fuel cell 10 and the external load 200 is interrupted once to thereby make it possible to recover the voltage of the negative voltage cell 11 to the voltage before negative voltage occurs. In addition, a period of time during which electrical connection between the fuel cell 10 and the external load 200 is interrupted is held to a certain extent and then the electrical connection is reconnected to thereby make it possible to suppress a return to a negative voltage state after reconnection.

Here, the inventors of the invention found that it is desirable to set the interval time from interruption of electrical connection between the fuel cell 10 and the external load 200 to reconnection on the basis of an accumulated current value in a period during which negative voltage is generated. As described above, in a period during which negative voltage is generated because of poor hydrogen supply, oxygen of an amount corresponding to the electric charge output from the fuel cell 10 during the period is produced in the anode of the negative voltage cell 11 (the above described reaction formula (1a)). By providing the interval time on the basis of an accumulated current value in a period during which negative voltage is generated, oxygen present in the anode may be further reliably consumed by recombination reaction with hydrogen (reaction formula (3)) in the interval time.

Figure 15:
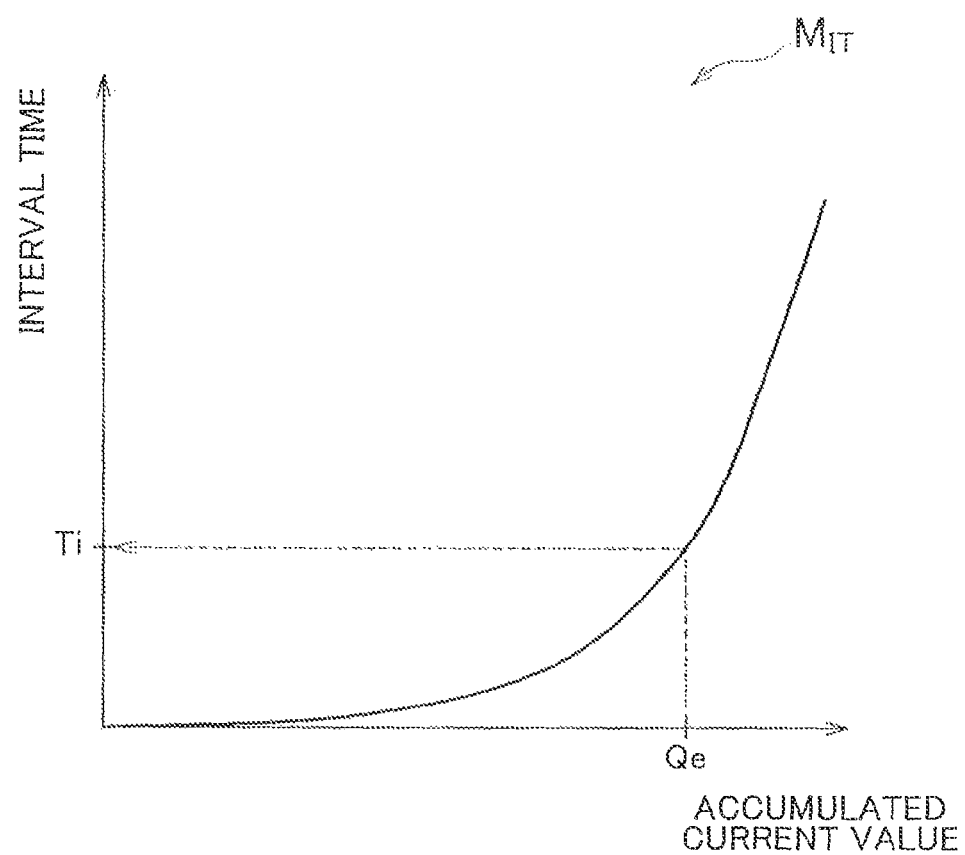
FIG. 15 is a graph for illustrating an interval time determination map according to the third embodiment of the invention.

FIG. 15 is a graph that shows an example of an interval time determination map $M_{IT}$ used in process of determining an interval time in step S230. The interval time determination map $M_{IT}$ is shown as a downward-convex ascent curve when the ordinate axis represents an interval time and the abscissa axis represents an accumulated current value. The correlation between an interval time and an accumulated current value, set in the interval time determination map $M_{IT}$, is set on the basis of the amount of oxygen produced in the anode of the negative voltage cell 11 in a period during which negative voltage is generated. The reconnection processing unit 22 uses the interval time determination map $M_{IT}$ to acquire an interval time Ti against an accumulated current value Qe acquired in step S220.

In step S240, the control unit 20 waits until the interval time Ti acquired in step S230 elapses. Note that the amount of hydrogen supplied to the fuel cell 10 is increased in step S50 of the negative voltage recovery process (FIG. 4) before the reconnection process is executed, so oxygen produced in the anode of the negative voltage cell 11 is recombined with hydrogen to be consumed during the Interval time Ti.

In step S250, the fuel cell 10 is electrically reconnected to the external load 200 to resume outputting electric power by the fuel cell 10. In step S260, it is determined whether the negative voltage cell 11 has recovered from negative voltage. When the negative voltage cell 11 has recovered from negative voltage, the process returns to normal operation control of the fuel cell 10 (FIG. 4: step S5). Then, when the negative voltage cell 11 has not recovered from negative voltage, an accumulated current value is acquired in step S220 again, and then an interval time is acquired in step S230 again. Note that, in the second and following processes of determining an interval time (step S230), it is desirable to set an Interval time by subtracting an interval time acquired in the previous process from an interval time acquired using the interval time determination map $M_{IT}$.

In this way, with the fuel cell system 100B according to the third embodiment, oxygen produced in the anode of the negative voltage cell 11 because of negative voltage due to poor hydrogen supply may be consumed in an interval time during which electrical connection between the fuel cell 10 and the external load 200 is interrupted. Thus, it is possible for the fuel cell 10 to further reliably recover from negative voltage, so it is possible to suppress degradation of the fuel cell 10 and deterioration of the power generation performance of the fuel cell 10.

Figure 16A:
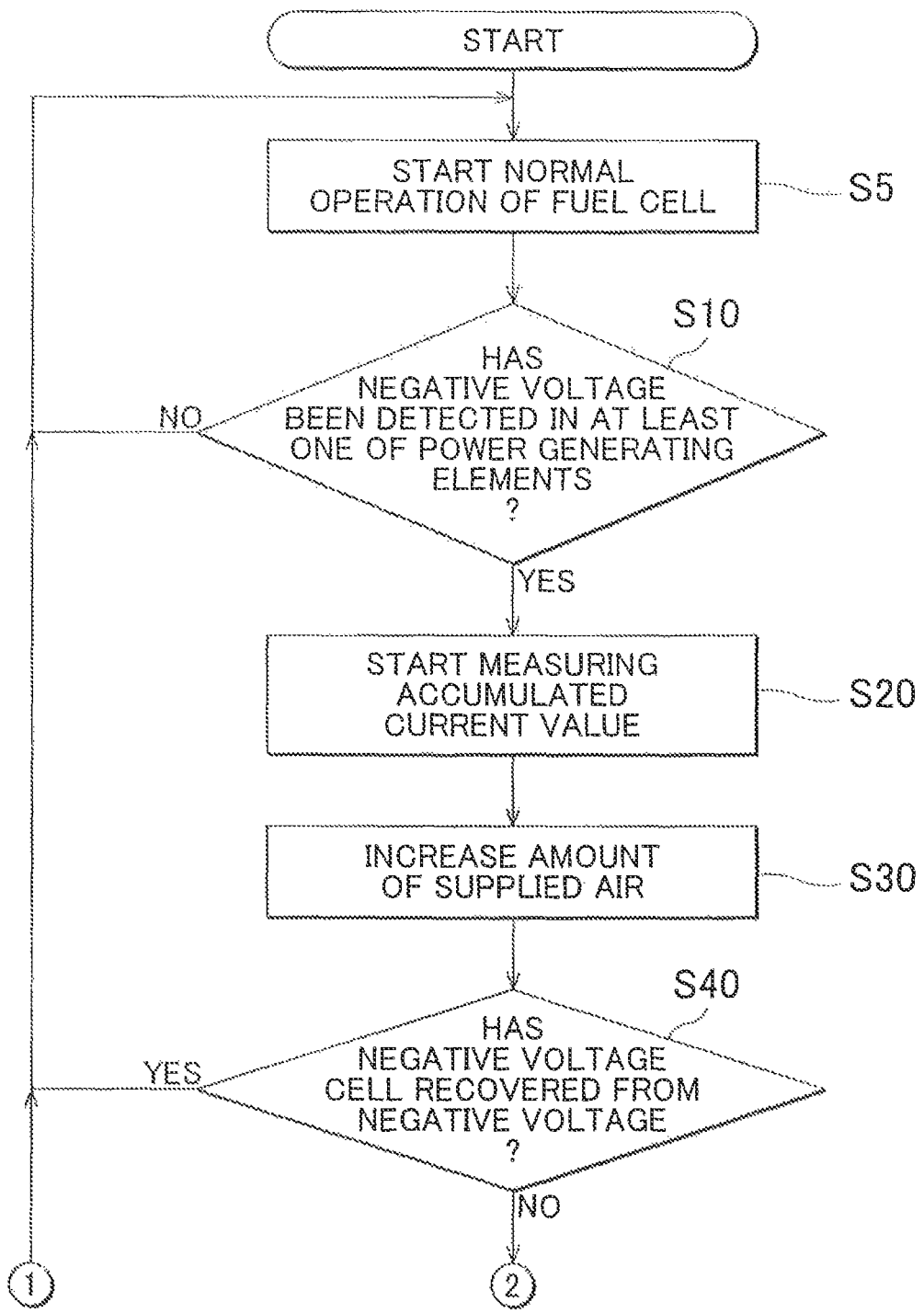
FIG. 16A and FIG. 16B are flowcharts that illustrate the procedure of a negative voltage recovery process according to a fourth embodiment of the invention.
Figure 16B:
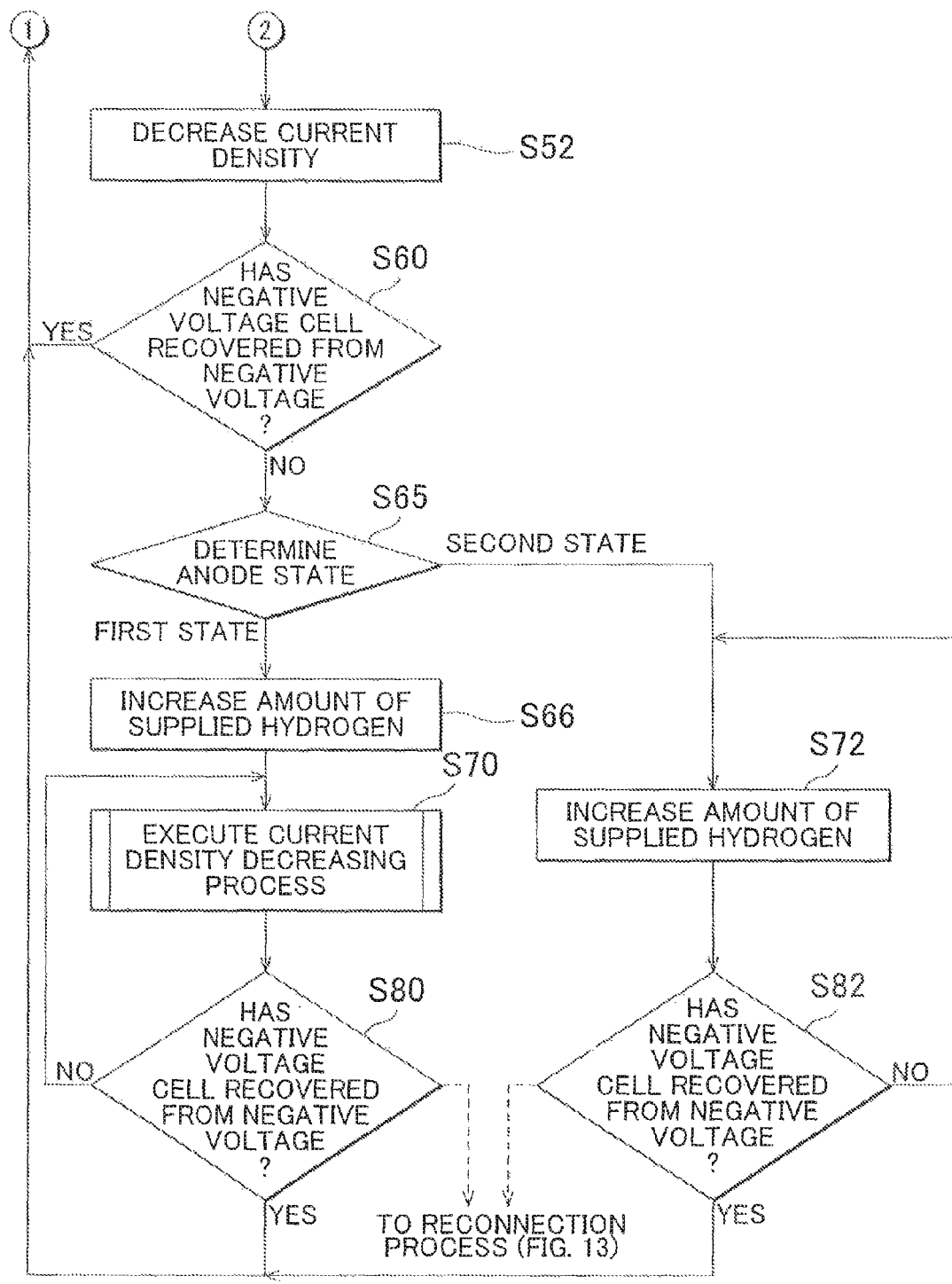

FIG. 16A and FIG. 16B are flowcharts that show the procedure of a negative voltage recovery process executed in a fuel cell system according to a fourth embodiment of the invention. FIG. 16A and FIG. 16B are substantially the same as FIG. 4 except that step S50 is omitted and steps S52, S65, S66, S72 and S82 are added. Note that the configuration of the fuel cell system according to the fourth embodiment is similar to that of the fuel, cell system 100B according to the third embodiment (FIG. 1, FIG. 12).

Here, as described in FIG. 6A to FIG. 6D, when negative voltage is generated because of poor hydrogen supply, there are a case where the negative voltage cell 11 can recover from negative voltage (FIG. 6D) and a case where the negative voltage cell 11 cannot recover from negative voltage (FIG. 6C) when hydrogen is supplied to the negative voltage cell 11. In the negative voltage recovery process according to the fourth embodiment, it is determined through the processes of steps S52 to S65 whether the state of the anode of the negative voltage cell 11 is a state where the negative voltage cell 11 can recover from negative voltage through supply of hydrogen.

FIG. 17 is a graph that shows the correlation between an electrode potential and a current density in each power generating element 11 when the ordinate axis represents a current density and the abscissa axis represents an electrode potential. In FIG. 17, the correlation between an electrode potential and current density of the negative voltage cell 11 in which water-splitting reaction (the above described reaction formula (1a)) in the anode is shown by the solid line graph $EP_1$. The solid line graph $EP_1$ has a substantially U shape, the electrode potential of the cathode is shown at the left side on the sheet, and the electrode potential of the anode is shown at the right side on the sheet.

In addition, FIG. 17 shows the correlation of the anode of the negative voltage cell 11 in the case where hydrogen oxidation reaction (the following reaction formula (4)) as a power generation reaction occurs in the anode by the alternate long and short dashes line graph $EP_2$. The alternate long and short dashes line graph $EP_2$ is shown as a substantially vertical upward-sloping graph on the left side of the solid line graph $EP_1$ on the sheet. Note that the correlation between an electrode potential and current density of the cathode corresponding to the anode, shown by the graph $EP_2$, is the same as the graph that shows the correlation between an electrode potential and current density of the cathode in the solid line graph $EP_1$.

$$H_2 \rightarrow 2H^+ + 2e^- \qquad (4)$$

Here, in the solid line graph $EP_1$, when the current density of the fuel cell 10 is $i_1$, the voltage value $E_{i1}$ of the negative voltage cell 11 may be obtained as a difference between the electrode potential $E_{A1}$ of the anode and the electrode potential $E_{C1}$ of the cathode against the current density $i_1$ ($E_{i1}=E_{A1}-E_{C1}$). In addition, when the current density of the fuel cell 10 is $i_2$ ($i_1>i_2$), the voltage value $E_{i2}$ of the negative voltage cell 11 is obtained similarly ($E_{i2}=E_{A2}-E_{C2}$).

FIG. 18 is a graph that shows a variation in cell voltage when hydrogen is supplied to the negative voltage cell 11 in which negative voltage is generated because of poor hydrogen supply, and the current density of the fuel cell 10 is decreased. In FIG. 18, the solid line graph Ga shows a variation in cell voltage when the negative voltage cell 11 has not recovered from negative voltage through supply of hydrogen where the ordinate axis represents a cell voltage and the abscissa axis represents time. In addition, the broken line graph Gb shows a variation in cell voltage when the negative voltage cell 11 has recovered from negative voltage through supply of hydrogen as a comparative example.

In the solid line graph Ga, negative voltage occurs at time $t_1$, and then the stoichiometric ratio of hydrogen is increased and the current density is decreased from $i_1$ to $i_2$ at time $t_2$ and, as a result, the voltage has slightly increased. The correlation between an electrode potential and a current density when the solid line graph Ga is obtained is similar to that when the solid line graph $EP_1$ of FIG. 17 is obtained, and the increase $\Delta E$ in cell voltage at time $t_2$ corresponds to the difference ($E_{A1}-E_{A2}+E_{C2}-E_{C1}$) between two voltage values $E_{i1}$ and $E_{i2}$ in the graph of FIG. 17. Note that the increase $\Delta E$ of the voltage corresponds to reaction overpotential.

Here, when the negative voltage cell 11 has not recovered from negative voltage even when hydrogen is supplied to the negative voltage cell 11 and water-splitting reaction continues in the anode of the negative voltage cell 11, the correlation between an electrode potential and current density of the negative voltage cell 11 is shown as the solid line graph $EP_1$ of FIG. 17. Then, at this time, when the current density of the fuel cell 10 is decreased from a predetermined first value to a predetermined second value, a variation (reaction overpotential) in cell voltage of the negative voltage cell 11 may be substantially constant.

However, when hydrogen oxidation reaction begins to resume as a power generation reaction in the anode of the negative voltage cell 11, a different variation in electrode potential and a different variation in cell voltage occur even when the current density of the fuel cell 10 is decreased similarly (the graph $EP_2$ of FIG. 17, the graph Gb of FIG. 18). Therefore, in this case, a reaction overpotential similar to that when water-splitting reaction continues in the anode of the negative voltage cell 11 is not obtained.

That is, it is possible to determine whether water-splitting reaction is occurring or hydrogen oxidation reaction is occurring in the anode of the negative voltage cell 11 on the basis of a variation in cell voltage of the negative voltage cell 11 at the time when the current density is decreased by a predetermined value. More specifically, the current density is decreased within a predetermined range at the time when water-splitting reaction is continuously occurring in the anode of the negative voltage cell 11 and then a measured reaction overpotential (value corresponding to the difference between the two voltage values $E_{i1}$ and $E_{i2}$ in FIG. 17) is recorded in advance. Then, when negative voltage has been detected in the fuel cell 10, the current density is decreased by the predetermined value, and then the recorded reaction overpotential is compared with a variation ($\Delta E$ in FIG. 18) in cell voltage of the negative voltage cell 11 at that time to thereby make it possible to identify the reaction that progresses in the anode of the negative voltage cell 11.

In the fuel cell system according to the fourth embodiment, in step S52 (FIG. 16B), the current density of the fuel cell 10 is decreased from the predetermined first value to the predetermined second value, and a variation in cell voltage of the negative voltage cell 11 is measured. Then, in step S60, it is determined whether the negative voltage cell 11 has recovered from negative voltage by decreasing the current density in step S52. In step S60, when the negative voltage cell 11 has recovered from negative voltage, normal operation control over the fuel cell 10 is directly resumed. When the negative voltage cell 11 has not recovered from negative voltage, determination for identifying the reaction that progresses in the anode is made in step S65 using the variation in cell voltage, obtained in step S52.

That is, when the variation in cell voltage falls within a predetermined allowable range obtained in advance, it is determined that the anode of the negative voltage cell 11 is in a "first state" where water-splitting reaction progresses. Here, the "predetermined allowable range" is a numeric value range near the voltage variation of the negative voltage cell 11, which is obtained by decreasing the current density from the predetermined first value to the predetermined second value while water-splitting reaction is continuously occurring in the anode of the negative voltage cell 11. On the other hand, when the variation in cell voltage falls outside the predetermined allowable range, it is determined that the anode of the negative voltage cell 11 is in a "second state" where hydrogen oxidation reaction is occurring.

In step S65, when it is determined that the anode of the negative voltage cell 11 is in the first state, the negative voltage cell 11 may not recover from negative voltage only by increasing the amount of supplied hydrogen. Therefore, in this case, in step S66, the amount of hydrogen supplied to the fuel cell 10 is increased and the current density decreasing process of step S70 (FIG. 7) is executed, and then the current density decreasing process is repeated until the negative voltage cell 11 recovers from negative voltage (step S80).

On the other hand, in step S65, when it is determined that the anode of the negative voltage cell 11 is in the second state, the negative voltage cell 11 may recover from negative voltage only by increasing the amount of supplied hydrogen. Therefore, in step S72, the amount of hydrogen supplied to the fuel cell 10 is increased. Then, step S72 is repeated until the negative voltage cell 11 recovers from negative voltage (step S82). Note that, when it is determined a predetermined number of times in step S80 or S82 that the negative voltage cell 11 has not recovered from negative voltage, the reconnection process (FIG. 13) described in the third embodiment is executed to cause the negative voltage cell 11 to recover from negative voltage.

In this way, with the fuel cell system according to the fourth embodiment, it is possible to identify the reaction that progresses in the anode of the negative voltage cell 11 from a variation in cell voltage of the negative voltage cell 11 at the time when the current density is decreased. Therefore, it is possible to appropriately execute process for recovering from negative voltage in response to the state in the anode of the negative voltage cell 11.

Note that, under a low temperature environment, such as below zero, the hydrogen circulation pump 64, or the like, may be driven at the maximum rotational speed in order to rapidly warm up the fuel cell 10. In such a case, it is difficult to further increase the amount of supplied hydrogen, and it is difficult to determine that negative voltage is due to poor hydrogen supply in the case where the negative voltage cell 11 has not recovered from negative voltage after increasing the amount of supplied hydrogen as in the case of another embodiment. However, as in the case of the fourth embodiment, when the state in the anode of the negative voltage cell 11 is identified using a variation in voltage of the negative voltage cell 11 at the time when the current density is decreased, the above described determination may be omitted, and it is possible to appropriately execute process for recovering from negative voltage.

Figure 19A:
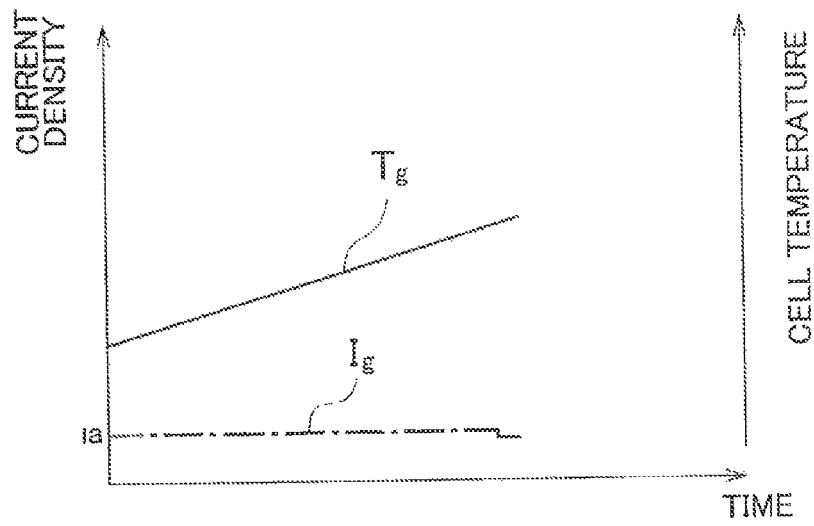
FIG. 19A and FIG. 19B are graphs for illustrating a time variation in cell temperature of a negative voltage cell under a low temperature environment according to reference examples of the invention.
Figure 19B:
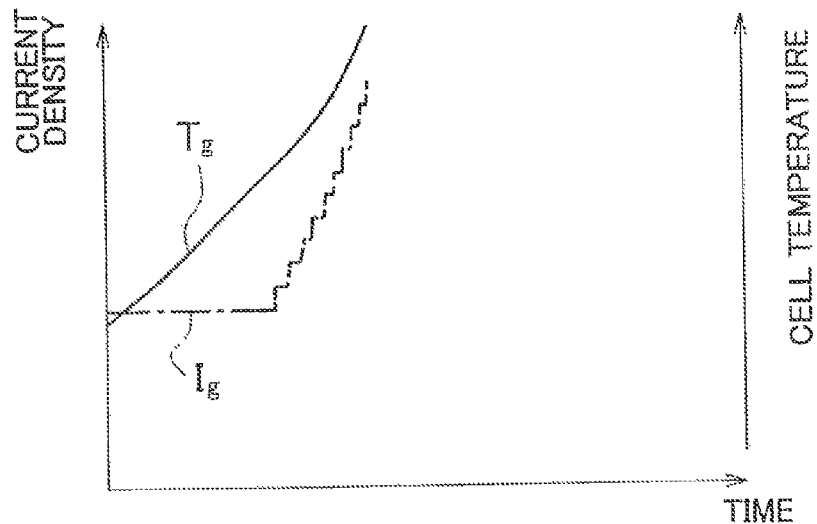

FIG. 19A and FIG. 19B are graphs that the results of the experiments conducted by the inventors of the invention as reference examples of the invention. FIG. 19A and FIG. 19B are graphs that show a time variation in the temperature of the negative voltage cell (cell temperature) and a time variation in the current density of the fuel cell when one of the single cells of the fuel cell is caused to generate negative voltage in a low temperature environment below zero. FIG. 19A shows the case where electric power output from the fuel cell is restricted at a substantially constant low current density, FIG. 19B shows the case where the current density is gradually increased. Note that the scale of each of the ordinate axis and abscissa axis of FIG. 19A and FIG. 19B is equal to each other.

Here, negative voltage in part of the single cells of the fuel cell may possibly occur because water content that remains in the reaction gas flow passages provided in the part of the single cells freezes in a low temperature environment and then the gas flow passages are blocked. In such a case, it is desirable that the temperature of the fuel cell is increased to defrost the frozen water content in the gas flow passages to thereby eliminate poor reaction gas supply, thus recovering from negative voltage.

As shown in the graphs of FIG. 19A and FIG. 19B, an increase in cell temperature is gentler when the fuel cell is caused to output electric power at a constant low current density than when the fuel cell is caused to output electric power at a current density higher than the constant low current density. Thus, when negative voltage is generated, the fuel cell is desirably caused to output electric power at a high current density as much as possible to thereby increase the operating temperature of the fuel cell in a short period of time.

In the current density decreasing process at the time when negative voltage is generated, described in the above embodiments, the current density threshold $i_{max}$ at or below which the amount of oxygen present in the anode of the negative voltage cell 11 may be reduced is obtained, and then the current density is gradually reduced from the current density threshold $i_{max}$ to thereby attempt to recover from negative voltage. Thus, in order to recover from negative voltage, it is possible to suppress an excessive decrease of the current density of the fuel cell. Thus, in comparison with the case where the fuel cell is operated at a preset constant low current density in order to recover from negative voltage, it is possible to increase the temperature of the fuel cell in a short period of time, so it is possible to further reliably recover from negative voltage in a low temperature environment.

Note that the aspect of the invention is not limited to the above examples or embodiments; the aspect of the invention may be implemented in various forms without departing from the scope of the invention. For example, the following alternative embodiments are possible.

(First Alternative Embodiment)

In the above described embodiments, the control unit 20 stores the oxygen consumption rate map $M_{GV}$ as the correlation between an accumulated current value and an oxygen consumption rate in the storage unit, and stores the current density threshold map $M_{TC}$ as the correlation between a current density and an oxygen production rate in the storage unit. However, these correlations do not need to be stored as maps; instead, for example, these correlations may be stored as arithmetic expressions or functions. Note that the same applies to the various maps described in the above described embodiments.

(Second Alternative Embodiment)

In the above described embodiments, the cell voltage measuring unit 91 measures the voltages of ah the power generating elements 11 of the fuel cell 10 to thereby detect negative voltage. However, the cell voltage measuring unit 91 does not need to measure the voltages of all the power generating elements 11; the cell voltage measuring unit 91 just needs to measure the voltage of at least one of the power generating elements 11 to thereby detect negative voltage. For example, it is known that it is highly likely that negative voltage occurs In the power generating element 11 arranged at the end portion of the fuel cell 10, at which the operating temperature tends to be the lowest, among the power generating elements 11. Then, the cell voltage measuring unit 91 may measure, the voltage of only the power generating element 11 arranged at the end portion to detect negative voltage.

(Third Alternative Embodiment)

In the first embodiment, the control unit 20 uses the oxygen consumption rate map $M_{GV}$ and the current density threshold map $M_{TC}$ to determine the current density threshold $i_{max}$ so as to reduce oxygen present in the anode of the negative voltage cell 11. Instead, the control unit 20 may use a single map that indicates the correlation between an accumulated current value and a current density, which is a combination of the oxygen consumption rate map $M_{GV}$ and the current density threshold map $M_{TC}$, to acquire a current density threshold against an accumulated current value in a period during winch negative voltage is generated.

In addition, the control unit 20 may prestore, in the storage unit, the correlation between an accumulated current value in a period during which negative voltage is generated and a current density at or below which the negative voltage cell 11 may recover from negative voltage by increasing the amount of supplied hydrogen, instead of the oxygen consumption rate map $M_{GV}$ and the current density threshold map $M_{TC}$, and then may use the correlation to execute output restricting process in which the fuel cell 10 is caused to output electric power at a current density that is lower than or equal to a current density obtained against an accumulated current value in a period during which negative voltage is generated.

(Fourth Alternative Embodiment)

In the second embodiment or another configuration example of the second embodiment, the control unit 20 stores the oxygen consumption rate map $M_{GVH}$ or $M_{GVT}$ for each accumulated current value in the storage unit and uses the oxygen consumption rate map $M_{GVH}$ or $M_{GVT}$. Instead, it is applicable that the control unit 20 prestores an oxygen consumption rate map $M_{GV}$ for each humidity inside the fuel cell 10 or each operating temperature of the fuel cell 10 in the storage unit and then selects and uses the one corresponding to a detected humidity inside the fuel cell 10 or a detected operating temperature of the fuel cell 10 from among the maps.

(Fifth Alternative Embodiment)

In the third embodiment, the reconnection process is executed when it is difficult to recover from negative voltage in the current density decreasing process. Instead, when negative voltage has been detected, the reconnection process may be executed at another timing. For example, the reconnection process may be immediately executed after negative voltage has been detected, or may be executed after negative voltage has been detected and when the negative voltage cell 11 has not recovered from negative voltage even when the amount of supplied hydrogen is increased.

(Sixth Alternative Embodiment)

In the fourth embodiment, when it is determined that water-splitting reaction progresses to produce oxygen in the anode of the negative voltage cell 11, the current density decreasing process described in the first embodiment is executed (FIG. 16A and FIG. 16B). Instead, when it is determined that water-splitting reaction progresses to produce oxygen in the anode of the negative voltage cell 11, not the current density decreasing process but process of decreasing the current density of the fuel cell 10 may be executed in another procedure.

(Seventh Alternative Embodiment)

In the above described embodiments, the correlation between a current density and oxygen production rate of the fuel cell 10 is set in the current density threshold map $M_{TC}$. Instead, the correlation between a current value, instead of a current density, and oxygen production rate of the fuel cell 10 may be set in the current density threshold map $M_{TC}$. The current value of the fuel cell 10 is obtained by multiplying the current density by the area of the electrode, so the correlation between a current value of the fuel cell 10 and an oxygen production rate of the fuel cell 10 may also be considered as one type of correlation between a current density of the fuel cell 10 and an oxygen production rate of the fuel cell 10. Note that, in the above described embodiments, control over the current density of the fuel cell 10, executed by the control unit 20, may be interpreted as control over the current value of the fuel cell 10.

(Eighth Alternative Embodiment)

In the above described embodiments, in the fuel cell systems 100 and 100B, when the negative voltage cell 11 has not recovered from negative voltage after the amount of supplied cathode gas is increased, it is determined that the negative voltage is generated because of poor hydrogen supply, and then the current density decreasing process or the determination process for identifying the reaction that is occurring in the anode of the negative voltage cell 11 is executed. Instead, the current density decreasing process or the determination process for identifying the reaction that is occurring in the anode may be started after negative voltage has been detected without executing the process of recovering from negative voltage by increasing the amount of supplied cathode gas.

(Ninth Alternative Embodiment)

In the above described embodiments, in the fuel cell systems 100 and 100B, when negative voltage has been detected, the recovery process for recovering from negative voltage is executed and, in the recovery process, the current density decreasing process is executed. Instead, it is applicable that, in the fuel cell systems 100 and 100B, when a preset environmental condition that indicates that there is a possibility that negative voltage is generated is satisfied even when negative voltage has not been detected, it is determined that negative voltage is generated and then the current density decreasing process is executed. For example, the current density decreasing process may be executed under an environment that the outside air temperature is at or below zero, when the temperature of the fuel cell 10 is near a temperature at or below zero, or the like.

The invention has been described with reference to example embodiments for illustrative purposes only. It should be understood that the description is not intended to be exhaustive or to limit form of the invention and that the invention may be adapted for use in other systems and applications. The scope of the invention embraces various modifications and equivalent arrangements that may be conceived by one skilled in the art.

The invention claimed is:

1. A fuel cell system that outputs electric power in response to a request from an external load, comprising:
a fuel cell that has at least one power generating element;
a control unit programmed to control an electric power output from the fuel cell, and
an accumulated current value measuring unit configured to measure an accumulated current value that is obtained by time integration of current output from the fuel cell, wherein
the accumulated current value measuring unit is configured to measure an accumulated current value in an oxygen generation period during which there is a possibility that negative voltage is generated in the at least one power generating element and oxygen is produced by water-splitting reaction in an anode of the at least one power generating element, the control unit is programmed to prestore a first correlation between a predetermined value based on the accumulated current value in the oxygen generation period and an oxygen consumption rate at which oxygen is recombined with hydrogen to be consumed in the anode of the at least one power generating element in which negative voltage is generated and a second correlation between a current density of the fuel cell in the oxygen generation period and an oxygen production rate at which oxygen is produced in the anode of the at least one power generating element in which negative voltage is generated in the oxygen generation period, and the control unit is programmed to, when it is determined that there is a possibility that negative voltage is generated in the at least one power generating element, use the first correlation to obtain an oxygen consumption rate and use the second correlation to obtain a current density corresponding to an oxygen production rate equivalent to the oxygen consumption rate obtained from the first correlation, and execute an output restricting process of causing the fuel cell to output electric power at a current density that is lower than the obtained current density corresponding to the oxygen production rate.

2. The fuel cell system according to claim 1, further comprising:

a negative voltage detecting unit that is configured to measure a voltage of the at least one power generating element to detect negative voltage in the at least one power generating element, wherein the accumulated current value measuring unit is configured to measure an accumulated current value in an oxygen generation period during which negative voltage is generated in the at least one power generating element and oxygen is produced by water-splitting reaction in the anode of the at least one power generating element, the first correlation is a correlation between the accumulated current value in the oxygen generation period and the oxygen consumption rate at which oxygen is recombined with hydrogen to be consumed in the anode of the at least one power generating element in which negative voltage is generated, and the control unit is programmed to, when negative voltage has been detected in the at least one power generating element, use the first correlation to obtain an oxygen consumption rate corresponding to the accumulated current value in the oxygen generation period and use the second correlation to obtain a current density corresponding to an oxygen production rate equivalent to the oxygen consumption rate obtained from the first correlation, and execute output restricting process of causing the fuel cell to output electric power at a current density that is lower than the obtained current density corresponding to the oxygen production rate.

3. The fuel cell system according to claim 2, further comprising:

a reaction gas supply unit that is configured to supply reaction gas to the fuel cell, wherein the control unit is programmed to, when negative voltage has been detected in the at least one power generating element, decrease the current density of the fuel cell within a preset range and detect a variation in voltage of the at least one power generating element, in which negative voltage is generated, before and after the current density is decreased, and, when the variation in voltage falls within a predetermined allowable range, execute the output restricting process and execute a gas amount increasing process of increasing an amount of reaction gas supplied to the fuel cell, whereas, the control unit is programmed to, when the variation in voltage falls outside the predetermined allowable range, execute the gas amount increasing process without executing the output restricting process.

4. The fuel cell system according to claim 2, further comprising:

a control switch configured to control an electrical connection between the fuel cell and the external load, wherein the control unit is programmed to, when the current density corresponding to the oxygen production rate is lower than a preset value in the output restricting process, interrupt the electrical connection between the external load and the fuel cell and then execute a reconnection process of electrically connecting the fuel cell to the external load again, and the control unit is programmed to, in the reconnection process, an interval time from when electrical connection between the fuel cell and the external load is interrupted to when the fuel cell is connected to the external load again on the basis of the accumulated current value in the oxygen generation period.

5. The fuel cell system according to claim 1, further comprising:

a negative voltage detecting unit configured to measure a voltage of the at least one power generating element to detect negative voltage in the at least one power generating element; and an operating state detecting unit that includes at least one of a humidity coefficient detecting unit configured to detect a wet state inside the fuel cell and an operating temperature measuring unit configured to detect an operating temperature of the fuel cell, wherein the accumulated current value measuring unit is configured to measure an accumulated current value in an oxygen generation period during which negative voltage is generated in the at least one power generating element and oxygen is produced by water-splitting reaction in the anode of the at least one power generating element, the first correlation is a correlation prepared for each accumulated current value in the oxygen generation period, and is a correlation between at least one of the wet state detected by the humidity coefficient detecting unit and the operating temperature detected by the operating temperature measuring unit and an oxygen consumption rate at which oxygen is recombined with hydrogen to be consumed in the anode of the at least one power generating element in which negative voltage is generated, and the control unit is programmed to, when negative voltage has been detected in the at least one power generating element, use the first correlation corresponding to the accumulated current value in the oxygen generation period to obtain an oxygen consumption rate corresponding to the at least one of the wet state detected by the humidity coefficient detecting unit and the operating temperature detected by the operating temperature measuring unit and use the second correlation to obtain a current density corresponding to an oxygen production rate equivalent to the oxygen consumption rate obtained from the first correlation, and execute an output restricting process of causing the fuel cell to output electric power at a current density that is lower than the obtained current density corresponding to the oxygen production rate.

6. The fuel cell system according to claim 1, wherein the accumulated current value measuring unit is configured to measure an accumulated current value in an oxygen generation period during which the fuel cell is operated in a state where a preset environmental condition that negative voltage is generated in the at least one power generating element and oxygen is produced by water-splitting reaction in the anode of the at least one power generating element is satisfied, the first correlation is a correlation between the accumulated current value in the oxygen generation period and an oxygen consumption rate at which oxygen is recombined with hydrogen to be consumed in the anode of the at least one power generating element in which negative voltage is generated, and the control unit is programmed to, when the fuel cell is operated in the oxygen generation period, use the first correlation to obtain an oxygen consumption rate corresponding to the accumulated current value in the oxygen generation period and use the second correlation to obtain a current density corresponding to an oxygen production rate equivalent to the oxygen consumption rate obtained from the first correlation, and execute an output restricting process of causing the fuel cell to output electric power at a current density that is lower than the obtained current density corresponding to the oxygen production rate.

7. A control method for a fuel cell system that has a fuel cell having at least one power generating element, comprising:

determining whether there is a possibility that negative voltage is generated in the at least one power generating element;

measuring an accumulated current value in an oxygen generation period during which there is a possibility that negative voltage is generated in the at least one power generating element and oxygen is produced by water-splitting reaction in an anode of the at least one power generating element;

consulting a preset first correlation between a predetermined value based on the accumulated current value in the oxygen generation period and an oxygen consumption rate at which oxygen is recombined with hydrogen to be consumed in the anode of the at least one power generating element in which negative voltage is generated and a preset second correlation between a current density of the fuel cell in the oxygen generation period and an oxygen production rate at which oxygen is produced in the anode of the at least one power generating element in which negative voltage is generated in the oxygen generation period; and obtaining an oxygen consumption rate using the first correlation and obtaining a current density corresponding to an oxygen production rate equivalent to the oxygen consumption rate obtained from the first correlation using the second correlation, and executing output restricting process of causing the fuel cell to output electric power at a current density that is lower than the obtained current density corresponding to the oxygen production rate.

8. The control method according to claim 7, wherein negative voltage in the at least one power generating element is detected using a detecting unit, the first correlation is a preset correlation between the accumulated current value in the oxygen generation period and an oxygen consumption rate at which oxygen is recombined with hydrogen to be consumed in the anode of the at least one power generating element in which negative voltage is generated, and an oxygen consumption rate corresponding to the accumulated current value in the oxygen generation period is obtained using the first correlation, a current density corresponding to an oxygen production rate equivalent to the oxygen consumption rate obtained from the first correlation is obtained using the second correlation, and output restricting process of causing the fuel cell to output electric power at a current density that is lower than the obtained current density corresponding to the oxygen production rate is executed.

9. The control method according to claim 7, wherein an accumulated current value in an oxygen generation period during which the fuel cell is operated in a state where a preset environmental condition that negative voltage is generated in the at least one power generating element and oxygen is produced by water-splitting reaction in the anode of the at least one power generating element is satisfied is measured, the first correlation is a preset correlation between the accumulated current value in the oxygen generation period and an oxygen consumption rate at which oxygen is recombined with hydrogen to be consumed in the anode of the at least one power generating element in which negative voltage is generated, and an oxygen consumption rate corresponding to the accumulated current value in the oxygen generation period is obtained using the first correlation and a current density corresponding to an oxygen production rate equivalent to the oxygen consumption rate obtained from the first correlation is obtained using the second correlation, and output restricting process of causing the fuel cell to output electric power at a current density that is lower than the obtained current density corresponding to the oxygen production rate is executed.

* * * * *